US009893366B2

(12) United States Patent
Kojima et al.

(10) Patent No.: US 9,893,366 B2
(45) Date of Patent: Feb. 13, 2018

(54) METAL FINE PARTICLE ASSOCIATION AND METHOD FOR PRODUCING THE SAME

(71) Applicants: NATIONAL UNIVERSITY CORPORATION GUNMA UNIVERSITY, Maebashi-shi, Gunma (JP); NISSAN CHEMICAL INDUSTRIES, LTD., Tokyo (JP)

(72) Inventors: Keisuke Kojima, Funabashi (JP); Takuya Tsujiguchi, Kiryu (JP); Nobuyoshi Nakagawa, Kiryu (JP); Misaki Kojima, Kiryu (JP); Takanori Iwakami, Kiryu (JP)

(73) Assignees: NATIONAL UNIVERSITY CORPORATION GUNMA UNIVERSITY, Gunma (JP); NISSAN CHEMICAL INDUSTRIES, LTD., Tokyo (JP)

( * ) Notice: Subject to any disclaimer, the term of this patent is extended or adjusted under 35 U.S.C. 154(b) by 754 days.

(21) Appl. No.: 14/378,775

(22) PCT Filed: Feb. 14, 2013

(86) PCT No.: PCT/JP2013/053515
§ 371 (c)(1),
(2) Date: Aug. 14, 2014

(87) PCT Pub. No.: WO2013/122136
PCT Pub. Date: Aug. 22, 2013

(65) Prior Publication Data
US 2015/0030967 A1     Jan. 29, 2015

(30) Foreign Application Priority Data

Feb. 14, 2012   (JP) ................................. 2012-029721

(51) Int. Cl.
| H01M 4/86 | (2006.01) |
| H01M 4/92 | (2006.01) |
| H01M 4/88 | (2006.01) |
| H01M 4/90 | (2006.01) |
| B22F 1/00 | (2006.01) |
| B22F 9/24 | (2006.01) |
| C22C 5/04 | (2006.01) |
| B82Y 30/00 | (2011.01) |
| H01M 8/1007 | (2016.01) |

(52) U.S. Cl.
CPC ......... *H01M 4/8663* (2013.01); *B22F 1/0018* (2013.01); *B22F 9/24* (2013.01); *B82Y 30/00* (2013.01); *C22C 5/04* (2013.01); *H01M 4/8605* (2013.01); *H01M 4/8882* (2013.01); *H01M 4/9041* (2013.01); *H01M 4/926* (2013.01); *H01M 4/928* (2013.01); *H01M 8/1007* (2016.02)

(58) Field of Classification Search
None
See application file for complete search history.

(56) References Cited

U.S. PATENT DOCUMENTS

| 8,722,562 B2* | 5/2014 | Kojima | ............... | B01F 17/0007 502/159 |
| 2004/0127347 A1* | 7/2004 | Lee | ..................... | H01M 4/8605 502/101 |
| 2006/0251953 A1* | 11/2006 | Li | ........................... | H01M 4/92 502/150 |
| 2010/0048845 A1* | 2/2010 | Yasui | ....................... | C08F 2/38 526/204 |
| 2011/0008707 A1* | 1/2011 | Muraoka | ............. | H01M 4/9016 429/483 |

FOREIGN PATENT DOCUMENTS

| JP | A-2001-335804 | 12/2001 |
| JP | A-2003-208900 | 7/2003 |
| JP | A-2006-210314 | 8/2006 |
| JP | A-2008-081750 | 4/2008 |
| JP | A-2012-196666 | 10/2012 |
| WO | WO 2008/029688 A1 | 3/2008 |
| WO | WO 2010/021386 A1 | 2/2010 |

OTHER PUBLICATIONS

Liu et al., "Nanostructured Pt/C and Pd/C Catalysts for Direct Formic Acid Fuel Cells," *Journal of Power Sources*, 2006, pp. 831-835.
Li et al., "Synthesis of Highly Dispersed Pd/C Electro-Catalyst with High Activity for Formic Acid Oxidation," *Electrochemistry Communications*, 2007, pp. 1410-1415.
Bönnemann et al., "Nanoscale Colloidal Metals and Alloys Stabilized by Solvents and Surfactants: Preperation and Use as Catalyst Precursors," *Journal of Organometallic Chemistry*, 1996, pp. 143-162.
International Search Report issued in International Application No. PCT/JP2013/053515 dated Mar. 26, 2013.
Written Opinion of the International Searching Authority issued in International Application No. PCT/JP2013/053515 dated Mar. 26, 2013.

* cited by examiner

*Primary Examiner* — Rena D Cronin
(74) *Attorney, Agent, or Firm* — Oliff PLC

(57) ABSTRACT

There is provided a metal fine particle association suitably applied to an electrode catalyst to achieve even higher output leading to reduction in amount of the catalyst used, and a process for producing the same, that is, a metal fine particle association including a plurality of metal fine particles that have a mean particle diameter of 1 nm to 10 nm and are associated to form a single assembly, an association mixture including the metal fine particle association and a conductive support; a premix for forming an association, including metal fine particles, a metal fine particle dispersant made of a hyperbranched polymer, and a conductive support; and a method for producing the association mixture.

7 Claims, 9 Drawing Sheets

METAL FINE PARTICLE ASSOCIATION AND METHOD FOR PRODUCING THE SAME

TECHNICAL FIELD

The present invention relates to a metal fine particle association and a method for producing the same, and more specifically to a metal fine particle association in which metal fine particles having a mean particle diameter of 1 nm to 10 nm are associated and which is particularly useful as an electrode catalyst of a fuel cell.

BACKGROUND ART

Catalyst-supporting carbon in which catalyst metal particles are supported on conductive supports such as carbon particles has been generally used for an electrode catalyst of a polymer electrolyte fuel cell. Noble metals such as platinum (Pt) and palladium (Pd) are used as the catalyst metal particles. A large amount of noble metal (catalyst) is used, in particular, in direct fuel cells including solid electrolyte membranes because of the low reactivity of liquid fuels. For practical use of fuel cells, not only improvement in fuel cell performance per se but also reduction in amount of the catalyst used, that is, an electrode catalyst with higher activity in a small amount, has been sought.

To reduce the amount of a catalyst used, it is desired that noble metal (catalyst) particles have smaller particle diameters and that the catalyst be formed with particles evenly distributed without forming an aggregate. It has been proposed that a polyalcohol (Non-Patent Document 1) and a surfactant (Non-Patent Document 2) be used as a dispersant for catalyst particles because the control of particle diameters is easy and the resulting catalyst has particles having a small diameter and evenly distributed.

Those conventional dispersants, however, lead to clogging of active sites of the catalyst, and in order to apply them to the electrolyte catalyst of fuel cells, it is necessary to remove those dispersants through chemical reduction (Patent Document 1) or heat treatment (Non-Patent Document 2) after the metal fine particles are supported on a conductive support.

PRIOR ART DOCUMENTS

Patent Documents

Patent Document 1: Japanese Patent Application Publication No. 2006-210314 (JP 2006-210314 A)

Non-Patent Documents

Non-Patent Document 1: H. Li, G. Sun, Q. Jiang, M. Zhu, S. Sun, Q. Xin, Electrochemistry Communications 9 (2007) 1410-1415.
Non-Patent Document 2: Z. Liu, L. Hong, M. Tham, T. Lim, H, Jiang, Journal of Power Sources 161 (2006) 831-835.

SUMMARY OF THE INVENTION

Problem to be Solved by the Invention

As described above, in conventional dispersants such as a polyalcohol and a surfactant, catalyst metal particles can be supported on a conductive support while high dispersiveness and small particle diameters are maintained. However, the heat treatment subsequently performed to remove the dispersant gives thermal energy to the catalyst metal fine particles to cause them to be sintered and formed into a large aggregate due to the particle growth of the catalyst metal fine particles. With the process using the conventional dispersants, therefore, it is actually considerably difficult to obtain an electrode catalyst in which catalyst metal fine particles in a fine particle state are supported on a conductive support in a well dispersed state.

The present invention has been made in view of such a situation and aims to provide a metal fine particle association suitably applied to an electrode catalyst to achieve even higher output leading to reduction in amount of the catalyst used, and a process for producing the same.

Means for Solving the Problem

The inventors of the present invention have made elaborate studies in order to achieve the object above and found that a metal fine particle association in which a plurality of metal fine particles with a mean particle diameter of about a few nm are associated has excellent activity as a catalyst for fuel cells and that the use of a hyperbranched polymer having an ammonium group at a molecular end as a dispersant allows the metal fine particles to be supported in a well dispersed state as an association on a support added together, without being sintered, when the hyperbranched polymer is calcined to be removed by pyrolysis after the metal fine particles are dispersed. This finding has led to completion of the invention.

According to a first aspect, the present invention relates to a metal fine particle association comprising a plurality of metal fine particles that have a mean particle diameter of 1 nm to 10 nm and are associated to form a single assembly.

According to a second aspect, the present invention relates to the metal fine particle association according to the first aspect, in which 10 to 500 million of metal fine particles are associated to form a bunch-like assembly.

According to a third aspect, the present invention relates to the metal fine particle association according to the second aspect, in which the association is composed of a bunch-like assembly having a particle size of 5 nm to 1,000 nm in long diameter.

According to a fourth aspect, the present invention relates to the metal fine particle association according to any one of the first to third aspects, in which the metal fine particles are fine particles of at least one selected from the group consisting of iron (Fe), cobalt (Co), nickel (Ni), copper (Cu), ruthenium (Ru), rhodium (Rh), palladium (Pd), silver (Ag), tin (Sn), osmium (Os), iridium (Ir), platinum (Pt), and gold (Au).

According to a fifth aspect, the present invention relates to the metal fine particle association according to the fourth aspect, in which the metal fine particles are fine particles of at least one selected from the group consisting of nickel (Ni), palladium (Pd), and platinum (Pt).

According to a sixth aspect, the present invention relates to an association mixture comprising the metal fine particle association as described in any one of the first to fifth aspects and a conductive support.

According to a seventh aspect, the present invention relates to the association mixture according to the sixth aspect, further comprising a solvent.

According to an eighth aspect, the present invention relates to an association catalyst comprising the metal fine particle association as described in any one of the first to fifth aspects.]

According to a ninth aspect, the present invention relates to the association catalyst according to the eighth aspect, in which the metal fine particle association is supported on a conductive support.

According to a tenth aspect, the present invention relates to the association catalyst according to the ninth aspect, in which the conductive support is a carbon support.

According to an eleventh aspect, the present invention relates to a fuel cell electrode catalyst comprising the association catalyst as described in any one of the eighth to tenth aspects.

According to a twelfth aspect, the present invention relates to a fuel cell comprising the fuel cell electrode catalyst as described in the eleventh aspect.

According to a thirteenth aspect, the present invention relates to a premix for forming an association, comprising metal fine particles and a metal fine particle dispersant composed of a hyperbranched polymer.

According to a fourteenth aspect, the present invention relates to the premix according to the thirteenth aspect, further comprising a conductive support.

According to a fifteenth aspect, the present invention relates to the premix according to the thirteenth aspect or the fourteenth aspect, further comprising a solvent.

According to a sixteenth aspect, the present invention relates to the premix according to any one of the thirteenth to fifteenth aspects, in which the metal fine particles are fine particles of at least one selected from the group consisting of iron (Fe), cobalt (Co), nickel (Ni), copper (Cu), ruthenium (Ru), rhodium (Rh), palladium (Pd), silver (Ag), tin (Sn), osmium (Os), iridium (Ir), platinum (Pt), and gold (Au).

According to a seventeenth aspect, the present invention relates to the premix according to the sixteenth aspect, in which the metal fine particles are fine particles of at least one selected from the group consisting of nickel (Ni), palladium (Pd), and platinum (Pt).

According to an eighteenth aspect, the present invention relates to the premix according to any one of the thirteenth to seventeenth aspects, in which the metal fine particle dispersant is a metal fine particle dispersant composed of a hyperbranched polymer having an ammonium group at a molecular end of the polymer.

According to a nineteenth aspect, the present invention relates to the premix according to the eighteenth aspect, in which the metal fine particle dispersant is a metal fine particle dispersant composed of a hyperbranched polymer of Formula [1]:

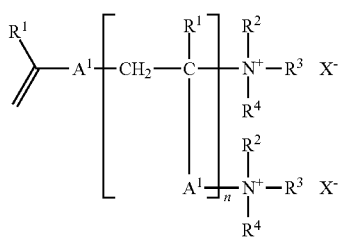

(where $R^1$ is independently a hydrogen atom or a methyl group; $R^2$ to $R^4$ are independently a hydrogen atom, a linear, branched, or cyclic alkyl group having a carbon atom number of 1 to 20, a $C_{7-20}$ arylalkyl group, or —$(CH_2CH_2O)_m R^5$ (where $R^5$ is a hydrogen atom or a methyl group; m is an integer from 2 to 100) (the alkyl group and the arylalkyl group are optionally substituted by an alkoxy group, a hydroxy group, an ammonium group, a carboxy group, or a cyano group), or $R^2$ to $R^4$ are optionally bonded to each other through a linear, branched, or cyclic alkylene group to form a ring together with a nitrogen atom bonded to $R^2$ to $R^4$; $X^-$ is an anion; n is the number of repeating unit structures and is an integer from 2 to 100,000; and $A^1$ is a structure of Formula [2])

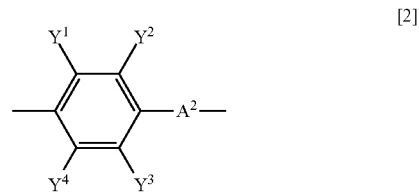

(where $A^1$ is a linear, branched, or cyclic alkylene group having a carbon atom number of 1 to 30 that optionally includes an ether bond or an ester bond; and $Y^1$ to $Y^4$ are independently a hydrogen atom, a $C_{1-20}$ alkyl group, a $C_{1-20}$ alkoxy group, a nitro group, a hydroxy group, an amino group, a carboxy group, or a cyano group).

According to a twentieth aspect, the present invention relates to the premix according to any one of the fourteenth to nineteenth aspects, in which the conductive support is a carbon support.

According to a twenty-first aspect, the present invention relates to a metal fine particle association or an association mixture obtained by subjecting the premix as described in any one of the thirteenth to twentieth aspects to a heating process at not lower than 200° C.

According to a twenty-second aspect, the present invention relates to a method for producing a metal fine particle association or an association mixture, characterized by subjecting the premix as described in any one of the thirteenth to twentieth aspects to a heating process at not lower than 200° C.

Effects of the Invention

The metal fine particle association of the present invention is not the one in which an aggregate is formed due to sintering of metal fine particles or other causes but is in the form of an association in which a plurality of particles having a particle diameter of about a few nm are assembled and associated. The association mixture is in the form in which the associations are well dispersed in the mixture. The metal fine particle association, the association mixture, and the association catalyst of the present invention therefore have excellent catalyst activity.

In the production method of the present invention, using a particular hyperbranched polymer as a dispersant for metal fine particles makes it possible to suppress sintering of metal fine particles, which is conventionally a problem, in heat treatment for removing the dispersant and produce a metal fine particle association, and to produce an association mixture in which the metal fine particles forming the association are well dispersed, and an association catalyst in which the metal fine particle associations are supported in a well dispersed state on a support. Activity loss due to formation of aggregates is suppressed, and thus a metal fine particle association having high catalyst activity as well as an association mixture and an association catalyst including the association and a conductive support therefore can be produced.

The present invention can provide a fuel cell electrode catalyst having high catalyst activity by using the metal fine particle association, the association mixture, and the association catalyst, and provide a fuel cell with high cell output.

MODES FOR CARRYING OUT THE INVENTION

[Metal Fine Particle Association]

Figure 1:
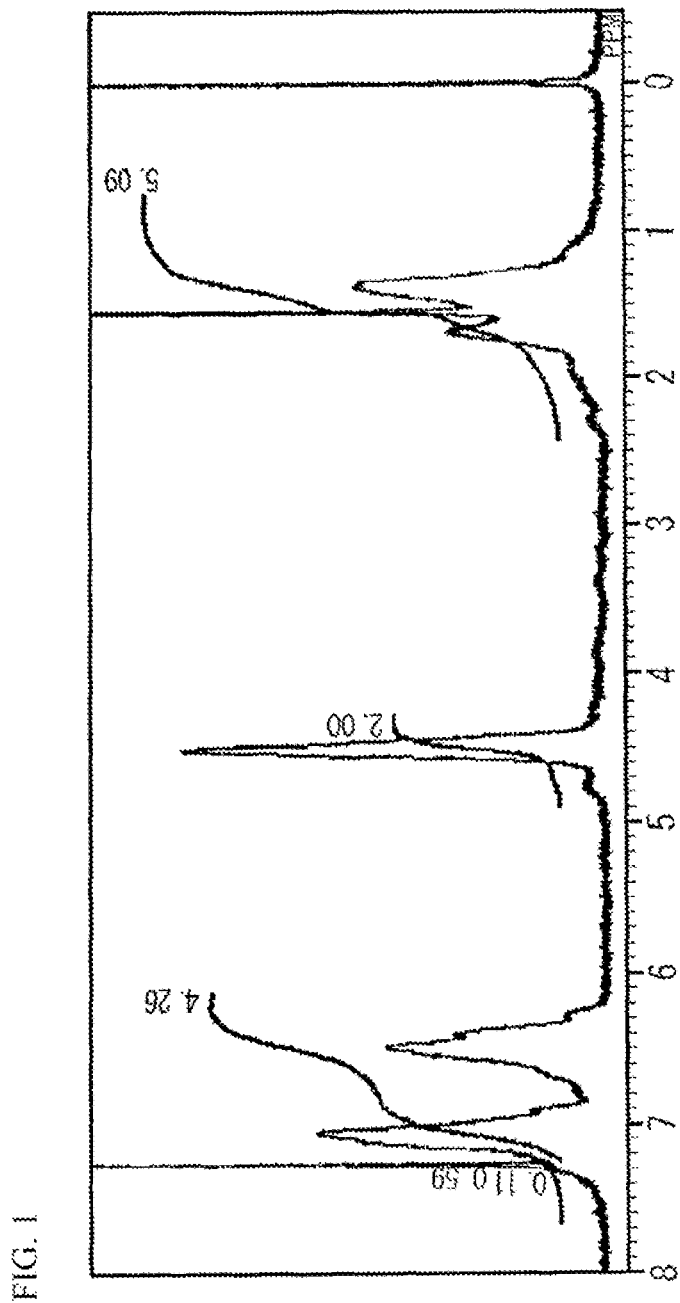
FIG. 1 is a diagram showing a $^1$H NMR spectrum of a hyperbranched polymer (HPS-Cl) that has a chlorine atom at a molecular end and that is obtained in Synthesis Example 1.

The metal fine particle association of the present invention is an association formed by associating metal fine particles with a mean particle diameter of 1 nm to 10 nm.

The metal fine particle association is preferably in the form in which approximately 10 to 500 million of the metal fine particles are assembled and has a length size of 5 nm to 1,000 nm in long diameter.

Here, the mean particle diameter of the metal fine particles is the value of the primary particle diameter obtained through electron microscopic observation, and the long diameter of the association is the value obtained through electron microscopic observation.

The metal fine particles that constitute the metal fine particle association are not limited to particular kinds. Example of the metal kind include iron (Fe), cobalt (Co), nickel (Ni), copper (Cu), ruthenium (Ru), rhodium (Rh), palladium (Pd), silver (Ag), tin (Sn), osmium (Os), iridium (Ir), platinum (Pt), and gold (Au). These metals can be used singly or in combination of two or more as an alloy. Among those, preferable examples of the metal fine particles include nickel (Ni) fine particles, palladium fine particles (Pd), and platinum (Pt) fine particles.

[Association Mixture and Association Catalyst]

The association mixture of the present invention includes the metal fine particle association and a conductive support.

In the present invention, the association catalyst refers to the form including the metal fine particle association or the form in which the metal fine particle association is supported on a conductive support. The prevent invention also embraces the association catalyst.

In the association mixture or the association catalyst in which the metal fine particle association is supported on a conductive support, the metal fine particle association content is 1% to 80% by mass, preferably 2% to 60% by mass, more preferably 3% to 50% by mass.

Any conductive support can be used as long as it has a specific surface for supporting the metal fine particle association in a desired dispersive state and has sufficient electron conductivity as a collector in an electrode of a fuel cell. Examples include metal oxides such as titanium oxide and carbon supports. Among those, carbon supports are preferably used. Specific examples of the carbon supports include carbon blacks such as furnace black, lamp black, acetylene black, channel black, and thermal black; activated carbon; carbon materials obtained by carbonizing organic compounds such as pitch, coke, polyacrylonitrile, phenolic resins, and furan resins; and graphitized carbons obtained by graphitizing them. Those called carbon nanohorns, carbon nanotubes, and carbon fibers can also be used as a conductive support.

The carbon blacks used may be commercially available products. Examples include VULCAN (registered trademark) XC-72, VULCAN P, BLACK PEARLS 880, BLACK PEARLS 1100, BLACK PEARLS 1300, and BLACK PEARLS 2000, and REGAL 400 manufactured by Cabot Corporation; KETJENBLACK EC and KETJENBLACK EC600JD manufactured by Lion Corporation; oil furnace black such as #3150 and #3250 manufactured by Mitsubishi Chemical Corporation; and acetylene black such as DENKA BLACK manufactured by DENKI KAGAKU KOGYO KABUSHIKI KAISHA.

Graphitized carbon may be used as the conductive support because of its good corrosion resistance. Graphitized carbon is obtained by heat-treating carbon black or other materials to crystallize the surface of carbon particles. Carbon black or other materials as raw materials of graphitized carbon may be any of those conventionally generally used. The heat treatment is preferably performed under a nitrogen, argon, helium, or other inert gas atmosphere. The heat treatment temperature and the heat treatment time, which vary depending on the carbon kind used, may be decided appropriately so that the resultant conductive support has desired corrosion resistance. The heat treatment may be performed at 2,000° C. to 3,000° C., preferably 2,600° C. to 3,000° C.

The conductive support may be the carbon support or graphitized carbon subjected to an activation process. The activation process can increase the specific surface of the carbon support and provide a conductive support capable of supporting the metal fine particle association in a highly dispersed state.

Examples of the activation process include an oxidizing activation process using zinc chloride, phosphoric acids, or other substances as an activator, an alkaline activation process using potassium hydroxide, sodium hydroxide, or other substances as an activator, a gas activation process using carbon dioxide, the air, or other substances as an activator, and a vapor activation process using water vapor as an activator. For example, in the vapor activation process, the carbon support can be activated by heating it to 800° C.

to 1,000° C. under a nitrogen gas atmosphere including saturated water vapor of about 80° C. or higher.

The specific surface of the conductive support may be preferably 20 m$^2$/g to 1,600 m$^2$/g, more preferably 80 m$^2$/g to 1,200 m$^2$/g. The specific surface less than 20 m$^2$/g may reduce the dispersiveness of the metal fine particle association on the conductive support, resulting in insufficient power generation performance. The specific surface exceeding 1,600 m$^2$/g may reduce the effective usability of the metal fine particle association, on the contrary. The specific surface is the value measured by BET.

The particle diameter of the conductive support is not particularly limited. However, the mean particle diameter of the conductive support is preferably about 5 nm to 200 nm, more preferably 10 nm to 100 nm, considering that the thickness, porosity, and others of the electrode catalyst layer and other components fabricated using the association catalyst including the metal fine particle association supported on the conductive support are controlled in an appropriate range.

The association mixture may include a solvent. Any solvent can be used here as long as it can dissolve or disperse the association mixture. Examples thereof include water; aromatic hydrocarbons such as benzene, toluene, xylene, ethylbenzene, chlorobenzene, and dichlorobenzene; alcohols such as methanol, ethanol, and isopropanol; ethers such as tetrahydrofuran, 1,4-dioxane, diethyl ether, diethylene glycol dimethyl ether, and propylene glycol methyl ether; esters such as ethyl acetate and butyl acetate; ketones such as acetone, ethyl methyl ketone, isobutyl methyl ketone, cyclopentanone, and cyclohexanone; aliphatic hydrocarbons such as n-heptane, n-hexane, and cyclohexane; halogenated aliphatic hydrocarbons such as 1,2-dichloroethane and chloroform; amides such as N-methyl-2-pyrrolidone, N,N-dimethylformamide, and N,N-dimethylacetamide; and dimethyl sulfoxide. These solvents can be used singly or in combination of two or more. Among those, preferred examples of the solvent include alcohols and ketones.

[Premix for Forming Association]

The present invention also embraces a premix for forming the association, such as a mixture including the metal fine particles and the metal fine particle dispersant composed of a hyperbranched polymer, and a mixture additionally including the conductive support. The premix may include a solvent.

Examples of the solvent used here are the same as the solvents that may be included in the association mixture.

<Metal Fine Particle Dispersant Composed of Hyperbranched Polymer>

In the present invention, the hyperbranched polymer used as the metal fine particle dispersant is a polymer having an ammonium group at a molecular end. A specific example thereof is a hyperbranched polymer of Formula [1] below.

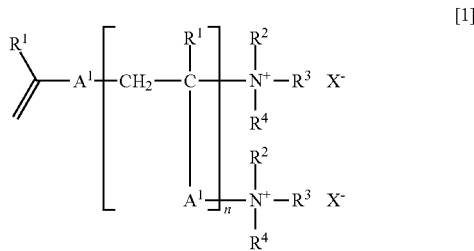

In Formula [1] above, $R^1$ is independently a hydrogen atom or a methyl group.

$R^2$ to $R^4$ are independently a hydrogen atom, a linear, branched, or cyclic alkyl group having a carbon atom number of 1 to 20, a $C_{7\text{-}20}$ arylalkyl group, or —(CH$_2$CH$_2$O)$_m$R$^5$ (where R$^5$ is a hydrogen atom or a methyl group; m is any integer from 2 to 100). The alkyl group and the arylalkyl group are optionally substituted by an alkoxy group, a hydroxy group, an ammonium group, a carboxy group, or a cyano group. $R^2$ to $R^4$ are optionally bonded to each other through a linear, branched, or cyclic alkylene group to form a ring together with the nitrogen atom bonded to them.

$X^-$ is an anion, and n is the number of repeating unit structures and is an integer from 2 to 100,000.

Examples of the linear alkyl group having a carbon atom number of 1 to 20 in $R^2$ to $R^4$ include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-eicosyl group. Among those, groups having a carbon atom number of not more than 8 are preferred. Examples of the branched alkyl group include an isopropyl group, an isobutyl group, a sec-butyl group, and a tert-butyl group. Examples of the cyclic alkyl group include groups having a cyclopentyl ring or cyclohexyl ring structure.

Examples of the $C_{7\text{-}20}$ arylalkyl group in $R^2$ to $R^4$ include a benzyl group and a phenethyl group.

Examples of the linear alkylene group through which $R^2$ to $R^4$ are bonded to each other include a methylene group, an ethylene group, an n-propylene group, an n-butylene group, and an n-hexylene group. Examples of the branched alkylene group include an isopropylene group, an isobutylene group, and a 2-methylpropylene group. Examples of the cyclic alkylene group include alicyclic aliphatic groups having monocyclic, polycyclic, and cross-linked cyclic $C_{3\text{-}30}$ ring structures. Specific examples include groups having monocyclic, bicyclic, tricyclic, tetracyclic, and pentacyclic structures having a carbon atom number of not less than 4.

In the structure of Formula [1], examples of the ring formed with $R^2$ to $R^4$ bonded to each other together with the nitrogen atom bonded to them include a pyridin ring, a pyrimidine ring, a pyrazine ring, a quinoline ring, and a bipyridyl ring.

Preferable examples of the anion in $X^-$ include $Cl^-$, $Br^-$, $I^-$, $PF_6^-$, $BF_4^-$, benzene sulfonate, tosylate, and perfluoroalkane sulfonate.

In Formula [1], $A^1$ is a structure of Formula [2] below.

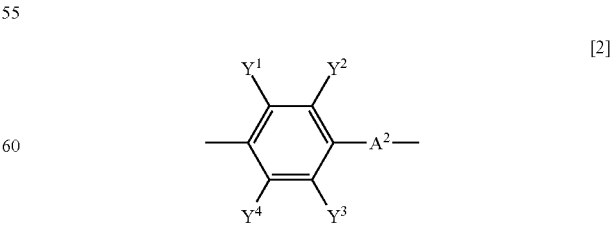

In Formula [2] above, $A^2$ is a linear, branched, or cyclic alkylene group having a carbon atom number of 1 to 30 that optionally includes an other bond or an ester bond.

$Y^1$ to $Y^4$ are independently a hydrogen atom, a $C_{1-20}$ alkyl group, a $C_{1-20}$ alkoxy group, a nitro group, a hydroxy group, an amino group, a carboxy group, or a cyano group.

Specific examples of the alkylene group in $A^2$ include linear alkylene groups such as a methylene group, an ethylene group, an n-propylene group, an n-butylene group, and an n-hexylene group, and branched alkylene groups such as an isopropylene group, an isobutylene group, and a 2-methylpropylene group. Examples of the cyclic alkylene group include alicyclic aliphatic groups having monocyclic, polycyclic, and cross-linked cyclic $C_{3-30}$ ring structures. Specific examples include groups having monocyclic, bicyclic, tricyclic, tetracyclic, and pentacyclic structures having a carbon atom number of not less than 4. For example, structure examples (a) to (s) of the alicyclic moiety of the alicyclic aliphatic groups are shown below.

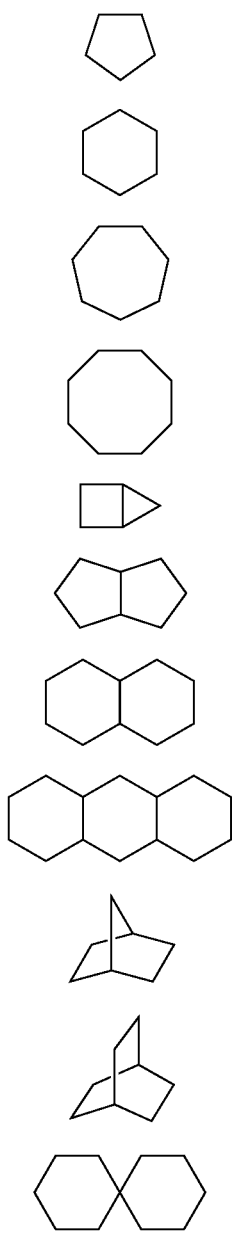

(a)
(b)
(c)
(d)
(e)
(f)
(g)
(h)
(i)
(j)
(k)

-continued

(l)

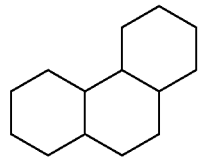

(m)

(n)

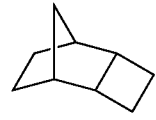

(o)

(p)

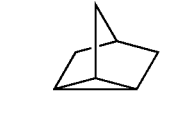

(q)

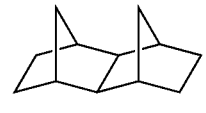

(r)

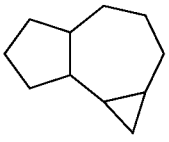

(s)

Examples of the $C_{1-20}$ alkyl group in $Y^1$ to $Y^4$ in Formula [2] above include a methyl group, an ethyl group, an isopropyl group, a cyclohexyl group, and an n-pentyl group. Examples of the $C_{1-20}$ alkoxy group include a methoxy group, an ethoxy group, an isopropoxy group, a cyclohexyloxy group, and an n-pentyloxy group. $Y^1$ to $Y^4$ are preferably a hydrogen atom or a $C_{1-20}$ alkyl group.

$A^1$ is preferably a structure of Formula [3] below.

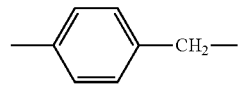

[3]

Preferably, an example of the hyperbranched polymer used in the present invention is a hyperbranched polymer of Formula [4] below.

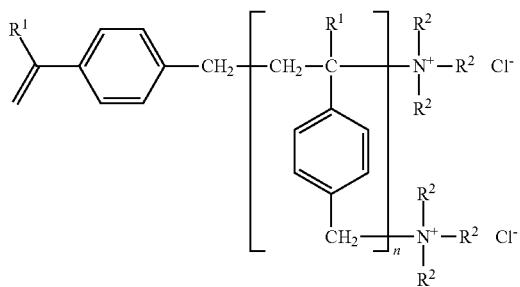

In Formula [4] above, $R^1$, $R^2$, and n are the same as those defined above.

The hyperbranched polymer having an ammonium group at a molecular end that is used in the present invention can be obtained, for example, by reacting a hyperbranched polymer having a halogen atom at a molecular end with an amine compound.

The hyperbranched polymer having a halogen atom at a molecular end can be produced from a hyperbranched polymer having a dithiocarbamate group at a molecular end according to the description of the publication WO2008/029688. The hyperbranched polymer having a dithiocarbamate group at a molecular end can be a commercially available product. For example, HYPERTECH (registered trademark) HPS-200 manufactured by NISSAN CHEMICAL INDUSTRIES, LTD. can be suitably used.

Examples of the amine compound used in this reaction include primary amines, for example, aliphatic amines such as methylamine, ethylamine, n-propylamine, isopropylamine, n-butylamine, isobutylamine, sec-butylamine, tert-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-nonadecylamine, and n-eicosylamine; alicyclic amines such as cyclopentylamine and cyclohexylamine; aralkyl amines such as benzylamine and phenethyl amine; aromatic amines such as anilines such as aniline, p-n-butylaniline, p-tert-butylaniline, p-n-octylaniline, p-n-decylaniline, p-n-didecylaniline, and p-n-tetradecylaniline, naphthylamines such as 1-naphthylamine and 2-naphthylamine, aminoanthracenes such as 1-aminoanthracene and 2-aminoanthracene, aminoanthraquinones such as 1-aminoanthraquinone, aminobiphenyls such as 4-aminobiphenyl and 2-aminobiphenyl, aminofluorenones such as 2-amninofluorene, 1-amino-9-fluorenone, and 4-amino-9-fluorenone, aminoindans such as 5-aminoindan, azninoisoquinolines such as 5-aminoisoquinoline, and aminophenanthrenes such as 9-aminophenanthrene. Other examples of the amine compounds include N-(tert-buthoxycarbonyl)-1,2-ethylenediamine, N-(tert-buthoxycarbonyl)-1,3-propylenediamine, N-(tert-buthoxycarbonyl)-1,4-butylenediamine, N-(tert-buthoxycarbonyl)-1,5-pentamethylenediamine, N-(tert-buthoxycarbonyl)-1,6-hexamethylenediamine, N-(2-hydroxyethyl)amine, N-(3-hydroxypropyl)amine, N-(2-methoxyethyl)amine, and N-(2-ethoxyethyl)amine.

Examples of the amine compound further include secondary amines, for example, aliphatic amines such as dimethylamine, diethylamine, di-n-propylamine, diisopropylamine, di-n-butylamine, diisobutylamine, di-sec-butylamine, di-n-pentylamine, ethylmethylamine, methyl-n-propylamine, methyl-n-butylamine, methyl-n-pentylamine, ethylisopropylamine, ethyl-n-butylamine, ethyl-n-pentylamine, methyl-n-octylamine, methyl-n-decylamine, methyl-n-dodecylamine, methyl-n-tetradecylamine, methyl-n-hexadecylamine, methyl-n-octadecylamine, ethylisopropylamine, ethyl-n-octylamine, di-n-hexylamine, di-n-octylamine, di-n-dodecylamine, di-n-hexadecylamine, and di-n-octadecylamine; alicyclic amines such as dicyclohexylamine; aralkyl amines such as dibenzylamine; aromatic amines such as diphenylamine; and nitrogen-containing heterocyclic compounds such as phthalimide, pyrrol, piperidine, piperazine, and imidazole. Other examples include bis(2-hydroxyethyl)amine, bis(3-hydroxypropyl)amine, bis(2-ethoxyethyl)amine, and bis(2-propoxyethyl)amine.

Examples of the amine compound further include tertiary amines, for example, aliphatic amines such as trimethylamine, triethylamine, tri-n-propylamine, tri-n-butylamine, tri-n-pentylamine, tri-n-hexylamine, tri-n-octylamine, dimethylethylamine, n-butyldimethylamine, dimethyl-n-hexylamine, dimethyl-n-octylamine, diethyl-n-decylamine, dimethyl-n-dodecylamine, dimethyl-n-tetradecylamine, dimethyl-n-hexadecylamine, dimethyl-n-octadecylamine, dimethyl-n-eicosylamine, and dimethyl-n-dodecylamine; and nitrogen-containing heterocyclic compounds such as pyridine, pyrazine, pyrimidine, quinoline, 1-methylimidazole, 4,4'-bipyridyl, and 4-methyl-4,4'-bipyridyl.

The amount of these amine compound used in the reaction may be 0.1 to molar equivalents, preferably 0.5 to 10 molar equivalents, more preferably 1 to 5 molar equivalents with respect to 1 mole of halogen atoms of the hyperbranched polymer having a halogen atom at a molecular end.

The reaction between the hyperbranched polymer having a halogen atom at a molecular end and the amine compound can be performed in water or an organic solvent in the presence or in the absence of a base. A solvent that can dissolve the hyperbranched polymer having a halogen atom at a molecular end and the amine compound is preferably used. A solvent that can dissolve the hyperbranched polymer having a halogen atom at a molecular end and the amine compound but cannot dissolve the hyperbranched polymer having an ammonium group at a molecular end is more preferable because isolation is easy.

Any solvent can be used in this reaction as long as it does not significantly inhibit progress of the reaction. Examples thereof include water; alcohols such as isopropanol; organic acids such as acetic acid; aromatic hydrocarbons such as benzene, toluene, xylene, ethylbenzene, and 1,2-dichlorobenzene; ethers such as tetrahydrofuran and diethyl ether; ketones such as acetone, ethyl methyl ketone, isobutyl methyl ketone, and cyclohexanone; and aliphatic hydrocarbons such as n-hexane, n-heptane, and cyclohexane; halogenated aliphatic hydrocarbons such as chloroform, dichloromethane, and 1,2-dichloroethane; and amides such as N,N-dimethylformamide, N,N-dimethylacetamide, and N-methyl-2-pyrrolidone. These solvents may be used singly or in combination of two or more. The amount of the solvent used is 0.2 to 1,000 times by mass, preferably 1 to 500 times by mass, more preferably 5 to 100 times by mass, most preferably 10 to 50 times by mass with respect to the mass of the hyperbranched polymer having a halogen atom at a molecular end.

Preferable examples of the base generally include inorganic compounds such as alkali metal hydroxides and alkaline earth metal hydroxides such as sodium hydroxide, potassium hydroxide, and calcium hydroxide; alkali metal oxides and alkaline earth metal oxides such as lithium oxide and calcium oxide; alkali metal hydrides and alkaline earth metal hydrides such as sodium hydride, potassium hydride, and calcium hydride; alkali metal amides such as sodium amide; alkali metal carbonates and alkaline earth metal carbonates such as lithium carbonate, sodium carbonate, potassium carbonate, and calcium carbonate; and alkali metal bicarbonates such as sodium bicarbonate. Other examples include organic metal compounds such as alkali metal alkyls, alkyl magnesium halides, alkali metal alkoxides, alkaline earth metal alkoxides, and dimethoxy magnesium. Particularly preferable examples include potassium carbonate and sodium carbonate. The amount of the base used is 0.2 to 10 molar equivalents, preferably 0.5 to 10 molar equivalents, most preferably 1 to 5 molar equivalents with respect to 1 mole of halogen atoms of the hyperbranched polymer having a halogen atom at a molecular end.

In this reaction, oxygen in the reaction system is preferably sufficiently purged before the start of the reaction, and the inside of the system may be replaced by an inert gas such as nitrogen or argon. The reaction conditions are appropriately selected from the reaction time from 0.01 to 100 hours and the reaction temperatures from 0° C. to 300° C. Preferably, the reaction time is 0.1 to 72 hours, and the reaction temperature is 20° C. to 150° C.

When a tertiary amine is used, the hyperbranched polymer of Formula [1] can be obtained irrespective of the presence or absence of a base.

When the hyperbranched polymer having a halogen atom at a molecular end is reacted with a primary amine or secondary amine compound in the absence of a base, a hyperbranched polymer having an ammonium group end is obtained in which the terminal secondary amine or tertiary amine of the corresponding hyperbranched polymer is protonated. When the reaction is performed using a base, an aqueous solution of acids such as hydrogen chloride, hydrogen bromide, and hydrogen iodide is mixed in an organic solvent, whereby a hyperbranched polymer having an ammonium group end is obtained in which the terminal secondary amine or tertiary amine of the corresponding hyperbranched polymer is protonated.

The weight average molecular weight Mw of the hyperbranched polymer that is measured in terms of polystyrene by gel permeation chromatography is 500 to 5,000,000, preferably 1,000 to 1,000,000, more preferably 2,000 to 500,000, most preferably 3,000 to 200,000. The degree of distribution Mw (weight average molecular weight)/Mn (number average molecular weight) is 1.0 to 7.0, preferably 1.1 to 6.0, more preferably 1.2 to 5.0.

[Production of Metal Fine Particle Association and Association Mixture]

The metal fine particle association or the association mixture of the present invention is obtained by heating the premix including the metal fine particles and the metal fine particle dispersant composed of the hyperbranched polymer, and the premix additionally including the conductive support, at 200° C. or higher.

As an example of the production process, a metal fine particle association may be produced by adding an aqueous solution of a salt of the metal that forms the metal fine particles (hereinafter called the metal salt) to a solution of the metal fine particle dispersant composed of the hyperbranched polymer to form a composite of the hyperbranched polymer and the metal fine particles, and calcining to remove the solvent and the hyperbranched polymer through a heating process. Alternatively, a metal fine particle association supported on a conductive support may be produced by forming the composite and thereafter adding a solution containing a conductive support to the solution containing the composite, mixing them to be homogenized, and calcining to remove the solvent and the hyperbranched polymer through a heating process.

The composite here refers to that the ammonium group at a molecular end of the hyperbranched polymer acts to coexist with the metal fine particle in contact or in proximity therewith to make a particulate form. In other words, the composite has a structure in which the ammonium group of the hyperbranched polymer adheres to or coordinates with the metal fine particle.

It is therefore understood that the "composite" in the present specification includes a single composite formed by the metal fine particle and the hyperbranched polymer bonded to each other as well as the one in which the metal fine particle and the hyperbranched polymer independently exist without forming a bond.

As an example of the process of forming the composite of the metal fine particle dispersant composed of the hyperbranched polymer and the metal fine particle, an aqueous solution of a metal salt is added to a solution of the metal fine particle dispersant composed of the hyperbranched polymer, followed by radiation of ultraviolet rays or addition of a reducer to reduce metal ions.

Examples of the metal salt include chloroauric acid, silver nitrate, copper sulfate, copper nitrate, copper acetate, tin chloride, platinum chloride, platinic chloride, $Pt(dba)_2$ [dba=dibenzylideneacetone], $Pt(cod)_2$ [cod=1,5-cyclooctadiene], $Pt(CH_3)_2(cod)$, palladium chloride, palladium acetate $(Pd(OC(=O)CH_3)_2)$, palladium nitrate, $Pd_2(dba)_3 \cdot CHCl_3$, $Pd(dba)_2$, and $Ni(cod)_2$.

The reducer is not limited to any specific kind, and a variety of reducers can be used. It is preferable that the reducer be selected, for example, depending on the metal kinds. Examples of the reducer that can be used include metal borohydride salts such as sodium borohydride and potassium borohydride; aluminium hydride salts such as aluminium lithium hydride, aluminium potassium hydride, aluminium cesium hydride, aluminium beryllium hydride, aluminium magnesium hydride, and aluminium calcium hydride; hydrazine compounds; citric acids and salts thereof, succinic acids and salts thereof, ascorbic acids and salts thereof; primary and secondary alcohols such as methanol, ethanol, isopropanol, and polyol; tertiary amines such as trimethylamine, triethylamine, diisopropyl(ethyl)amine, diethyl(methyl)amine, tetramethylethylenediamine [TMEDA], and ethylenediaminetetraacetic acid [EDTA]; hydroxylamine; and phosphines such as tri-n-propylphosphine, tri-n-butylphosphine, tricyclohexylphosphine, tribenzylphosphine, triphenylphosphine, triethoxyphosphine, 1,2-bis(diphenylphosphino)ethane [DPPE], 1,3-bis(diphenylphosphino)propane [DPPP], 1,1'-bis(diphenylphosphino)ferrocene [DPPF], and 2,2'-bis(diphenylphosphino)-1,1'-binaphthyl [BINAP].

Any solvent can be used in the reduction reaction as long as the solvent can dissolve the metal ions and the metal fine particle dispersant composed of the hyperbranched polymer having an ammonium group to a required concentration or more. Specific examples include alcohols such as methanol, ethanol, n-propanol, isopropanol, and ethylene glycol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; aromatic hydrocarbons such as benzene and toluene; and mixtures of these solvents.

As another example of the process of forming the composite of the metal fine particle dispersant composed of the hyperbranched polymer and the metal fine particle, the composite may be formed by synthesizing a metal fine particle stabilized to some extent by a lower ammonium ligand and thereafter exchanging the ligand by the metal fine particle dispersant composed of the hyperbranched polymer, or by directly reducing metal ions in a solution of the metal fine particle dispersant composed of the hyperbranched polymer having an ammonium group.

In the ligand exchange process, the metal fine particle stabilized to some extent by a lower ammonium ligand as a raw material can be synthesized by the process described, for example, in Journal of Organometallic Chemistry 1996, 520, 143-162. The metal fine particle dispersant composed of the hyperbranched polymer having an ammonium group is dissolved into a reaction mixture solution of the resultant metal fine particle and stirred under room temperature (about 25° C.) or with heating, resulting in the metal fine particle composite of interest.

Any solvent can be used as long as the solvent can dissolve the metal fine particles and the metal fine particle dispersant composed of the hyperbranched polymer having an ammonium group to a required concentration or more. Specific examples thereof include alcohols such as ethanol, propanol, and isopropanol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; and mixtures of these solvents.

The temperature at which the reaction mixture solution of the metal fine particles and the metal fine particle dispersant composed of the hyperbranched polymer having an ammonium group are mixed can be, in general, in a range from 0° C. to the boiling point of the solvent, preferably, in a range from room temperature (about 25° C.) to 60° C.

In the ligand exchange process, the metal fine particle can also be stabilized to some extent in advance by using a phosphine-based dispersant (phosphine ligand) other than the amine-based dispersant (lower ammonium ligand).

In the direct reduction process, metal ions and the metal fine particle dispersant composed of the hyperbranched polymer having an ammonium group may be dissolved in a solvent and reacted under a hydrogen gas atmosphere, resulting in the metal fine particle composite of interest.

Examples of the metal ion source used here include the metal salts described above and metal carbonyl complexes such as pentacarbonyliron [Fe(CO)$_5$], octacarbonyldicobalt [Co$_2$(CO)$_8$], and tetracarbonylnickel [Ni(CO)$_4$]. Zero-valent metal complexes such as metal-olefin complexes, metal-phosphine complexes, and metal-nitrogen complexes can also be used.

Any solvent can be used as long as the solvent can dissolve the metal ions and the hyperbranched polymer having an ammonium group to a required concentration or more. Specific examples thereof include alcohols such as ethanol and propanol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; and mixtures of these solvents.

The temperature at which the metal ions and the hyperbranched polymer having an ammonium group are mixed can be, in general, in a range from 0° C. to the boiling point of the solvent.

In the direct reduction process, metal ions and the hyperbranched polymer having an ammonium group may be dissolved in a solvent and subjected to a pyrolysis reaction, resulting in the metal fine particle composite of interest.

Examples of the metal ion source used here include the metal salts described above, metal carbonyl complexes and other zero-valent metal complexes, and metal oxides such as silver oxide.

Any solvent can be used as long as the solvent can dissolve the metal ions and the hyperbranched polymer having an ammonium group to a required concentration or more. Specific examples thereof include alcohols such as methanol, ethanol, n-propanol, isopropanol, and ethylene glycol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; aromatic hydrocarbons such as benzene and toluene; and mixtures of these solvents.

The temperature at which the metal ions and the hyperbranched polymer having an ammonium group are mixed can be, in general, in a range from 0° C. to the boiling point of the solvent, preferably in the vicinity of the boiling point of the solvent, for example, 110° C. (heated reflux) in the case of toluene.

In formation of the composite, the amount of the hyperbranched polymer added is preferably 50 to 2,000 parts by mass with respect to 100 parts by mass of the metal fine particles. If the amount is less than 50 parts by mass, the dispersiveness of the metal fine particles is insufficient. If the amount exceeds 2,000 parts by mass, the organic content increases and problems, for example, in physical properties are likely to occur. More preferably, 100 to 1,000 parts by mass is added.

The resultant composite of the metal fine particle dispersant composed of the hyperbranched polymer having an ammonium group and the metal fine particle is subjected to a purification process such as reprecipitation into a solid form such as powder.

The resultant composite of the metal fine particle dispersant composed of the hyperbranched polymer and the metal fine particles is dissolved (dispersed) in an appropriate solvent. To this solution (dispersion liquid), a solution (dispersion liquid) of the conductive support dissolved (dispersed) in an appropriate solvent as desired is added and mixed well to be homogenized.

Any solvent can be used as long as the solvent can dissolve the composite as well as the composite and the conductive support to a required concentration or more. Specific examples thereof include alcohols such as methanol, ethanol, n-propanol, isopropanol, and ethylene glycol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; aromatic hydrocarbons such as benzene and toluene; and mixtures of these solvents.

In the case where a conductive support is added to the solution (dispersion liquid) in which the composite of the metal fine particle dispersant composed of the hyperbranched polymer and the metal fine particles is dissolved (dispersed), the added amount is preferably such that the amount of the metal fine particle association supported on the conductive support is 1% to 80% by mass, preferably 2% to 60% by mass, more preferably 3% to 50% by mass with respect to the total amount of the conductive support and the metal fine particle association.

Subsequently, a solution (dispersion liquid) containing the composite of the metal fine particle dispersant composed of the hyperbranched polymer and the metal fine particle, or a solution (dispersion liquid) containing the composite and a solution (dispersion liquid) containing a conductive support are heated at a temperature of 200° C. or higher. The heating process is carried out, preferably under a nitrogen, argon, helium, or other inert gas atmosphere, preferably at a temperature of 300° C. or higher, more preferably at a temperature of 400° C. or higher, preferably at a temperature of 1,000° C. or lower, generally for 1 minute to 24 hours, preferably for 5 minutes to 12 hours, more preferably 10 minutes to 6 hours.

In the resultant metal fine particle association and the association mixture, the metal fine particle association is shaped such that a plurality of metal fine particles are arranged and associated like a cluster (bunch) as if it was a bunch of flowers or a bunch of fruits, and the association mixture is in the form of an association catalyst in which the association is supported on the conductive support.

[Fuel Cell Electrode Catalyst]

The metal fine particle association or the association mixture of the present invention can be used suitably in particular as an electrode catalyst of a fuel cell. Specifically, the present invention also embraces a fuel cell electrode catalyst composed of the association catalyst and a fuel cell including the fuel cell electrode catalyst.

Examples of the kinds of the fuel cell include, but not limited to, polymer electrolyte fuel cells, alkaline fuel cells, phosphoric acid fuel cells, molten carbonate fuel cells, and solid oxide fuel cells. Among those, polymer electrolyte fuel cells having a small size and capable of high density and high output are preferred.

In polymer electrolyte fuel cells, the electrode catalyst is preferably used as an electrode catalyst in the anode-side electrode catalyst layer and/or the cathode-side electrode catalyst layer and preferably used at least in the cathode-side electrode catalyst layer that requires high oxygen reduction activity in the electrode reaction.

EXAMPLES

Although the present invention will be described more specifically below with Examples, the present invention is not limited thereto. In Examples, the physical properties of the samples were determined using the following apparatuses under the conditions below.

(1) GPC (Gel Permeation Chromatography)
Apparatus: HLC-82200PC manufactured by TOSOH CORPORATION
Column: Shodex KF-804L+KF-803L
Column temperature: 40° C.
Solvent: tetrahydrofuran
Detector: UV (254 nm), RI (2) $^1$H NMR Spectrum
Apparatus: JNM-L400 manufactured by JEOL Ltd.
Solvent: $CDCl_3$
Internal standard: tetramethylsilane (0.00 ppm)

(3) $^{13}$C NMR Spectrum
Apparatus: JNM-ECA700 manufactured by JEOL Ltd.
Solvent: $CDCl_3$
Relaxation reagent: chromium trisacetylacetonate (Cr(acac)$_3$)
Reference: $CDCl_3$ (77.0 ppm)

(4) ICP Optical Emission Spectrometry (Inductively Coupled Plasma Optical Emission Spectrometry)
Apparatus: ICPM-8500 manufactured by Shimadzu Corporation (5) Ultrasonic Treatment (Ultrasonic Cleaner)
Apparatus: ASU-2 manufactured by AS ONE Corporation (6) TEM (Transmission Electron Microscope)
Apparatus: H-8000 manufactured by Hitachi High-Technologies Corporation
Acceleration voltage: 200 kV (7) CV (Cyclic Voltammetry)
Apparatus: Electrochemical Measurement System HZ-5000 manufactured by HOKUTO DENKO CORPORATION
Counter electrode: Pt wire CPt manufactured by International Chemistry Co., LTD.
Reference electrode: mercury/mercury sulfate reference electrode RE-2C manufactured by BAS Inc
Working electrode: GCE glassy carbon electrode manufactured by BAS Inc
Electrolyte A (formic acid oxidation activity evaluation): 0.05 mol/L sulfuric acid aqueous solution-5 mol/L formic acid aqueous solution mixture (volumetric ratio 1:1) (bubbling with nitrogen at 200 mL/min)
Electrolyte B (oxygen reduction activity evaluation): 0.05 mol/L sulfuric acid aqueous solution (bubbling with nitrogen or oxygen at 200 mL/min)
Sweep potential: 0 V to 1 V (against a hydrogen reference electrode)
Cycle count: 10
Scan speed: 10 mV/sec (8) Power Generation Test
Apparatus: Electrochemical Measurement System HZ-5000 manufactured by HOKUTO DENKO CORPORATION
Test cell: FC-05-02 manufactured by TOYO Corporation
Power generation fuel (anode): 7 mol/L formic acid aqueous solution, 3 mL/min
(cathode): oxygen, 0.2 L/min
Cell temperature: 30° C.

The abbreviations of the reagents and other substances used are as follows.
HPS: hyperbranched polystyrene [HYPERTECH (registered trademark) HPS-200 manufactured by NISSAN CHEMICAL INDUSTRIES, LTD.]
IPA: isopropanol
IPE: diisopropyl ether
dba: dibenzylideneacetone ($C_6H_5CH=CH—C(=O)—CH=CHC_6H_5$)
CB: carbon black [VULCAN (registered trademark) XC72 manufactured by Cabot Corporation]
PB: palladium black [Pd-black, manufactured by Alfa Aesar, 99.9%]
PtB: platinum black [HiSPEC (registered trademark) 1000 manufactured by Johnson Matthey Fuel Cells]
PtC: platinum carbon [TEC10E50E manufactured by TANAKA KIKINZOKU HANBAI K.K., the amount of supported platinum: 50% by mass]
PVP: poly(vinyl pyrrolidone)

Synthesis Example 1

Production of Chlorinated Hyperbranched Polymer (HPS-Cl)

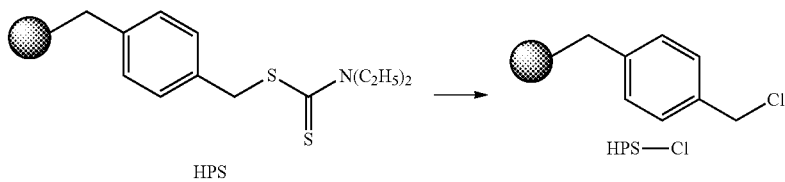

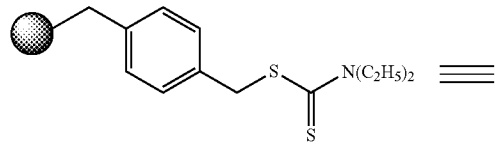 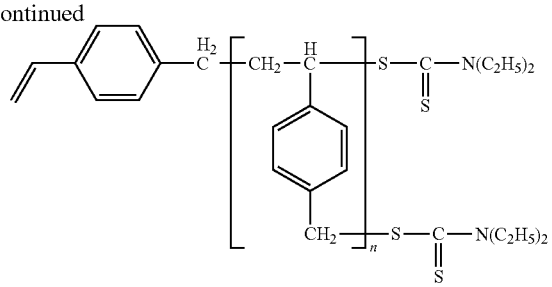

In a 500-mL reaction flask, 27 g of sulfuryl chloride [manufactured by KISHIDA CHEMICAL Co., Ltd.] and 50 g of chloroform were charged and stirred to be uniformly dissolved. This solution was cooled to 0° C. under a nitrogen gas flow.

In another 300-mL reaction flask, 15 g of hyperbranched polystyrene HPS having a dithiocarbamate group at a molecular end and 150 g of chloroform were charged and stirred to be homogenized under a nitrogen gas flow.

The solution was added from the 300-mL reaction flask containing the HPS/chloroform solution into the sulfuryl chloride/chloroform solution cooled to 0° C., using a transfer pump under a nitrogen gas flow over 60 minutes to attain reaction liquid temperatures of −5° C. to 5° C. After completion of the addition, the reaction liquid was stirred for six hours with the temperatures held at −5° C. to 5° C.

A solution of 16 g of cyclohexene [manufactured by Tokyo Chemical industry Co., Ltd.] dissolved in 50 g of chloroform was further added to this reaction liquid to attain reaction liquid temperatures of −5° C. to 5° C. After completion of the addition, this reaction liquid was added to 1,200 g of IPA to precipitate the polymer. White powder obtained by filtering the precipitation was dissolved in 100 g of chloroform, and this solution was added to 500 g of IPA to reprecipitate the polymer. This precipitation was filtered under reduced pressure and vacuum-dried, resulting in 8.5 g of a hyperbranched polymer (HPS-Cl) having a chlorine atom at a molecular end in the form of white powder (99% yield).

The $^1$H NMR spectrum of the resultant HPS-Cl is shown in FIG. 1. Based on the disappearance of the peaks (4.0 ppm, 3.7 ppm) assigned to the dithiocarbamate group, it is evident that in the resultant HPS-Cl, almost all the dithiocarbamate groups at the HPS molecular ends are substituted by chlorine atoms. The weight average molecular weight Mw of the resultant HPS-Cl measured by GPC in terms of polystyrene was 14,000, and the degree of distribution Mw/Mn was 2.9.

Synthesis Example 2

Production of Hyperbranched Polymer 1
(HPS-NEt$_3$Cl)

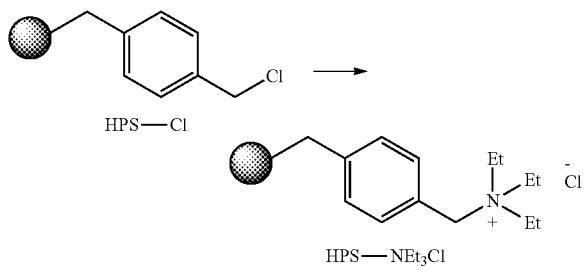

In a 50-mL reaction flask with a reflux tower, 3.0 g (20 mmol) of HPS-Cl produced in Synthesis Example 1, 2.0 g (20 mmol) of triethylamine [manufactured by JUNSEI CHEMICAL CO., LTD.], and 30 mL of a chloroform/IPA liquid mixture (volumetric ratio 2:1) were charged, followed by replacement by nitrogen. This mixture was heated to reflux with stirring for 48 hours.

After cooling to a liquid temperature of 30° C., the solvent was distilled off. The resultant residue was dissolved into 50 mL of chloroform, and this solution was added to mL of IPE for reprecipitation and purification. The precipitated polymer was filtered under reduced pressure and vacuum-dried at 40° C., resulting in 6.1 g of a hyperbranched polymer 1 (hereinafter abbreviated as HBP1) having a triethylammonium group at a molecular end in the form of pale brown powder.

Figure 2:
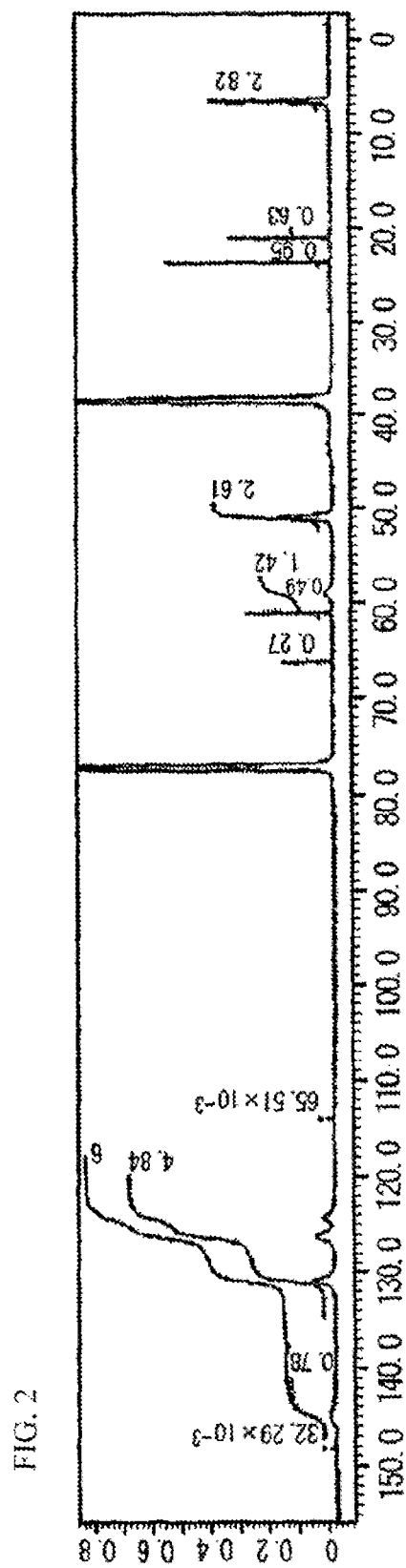
FIG. 2 is a diagram showing a $^{13}$C NMR spectrum of a hyperbranched polymer (HPS-NEt$_3$Cl) that has a triethylammonium group at a molecular end and that is obtained in Synthesis Example 2.

The $^{13}$C NMR spectrum of the resultant HBP1 is shown in FIG. 2. Based on the peaks of the methylene group bonded to a chlorine atom and the methylene group bonded to an ammonium group, it is evident that in the resultant HBP1, 91% of chlorine atoms at the HPS-Cl molecular ends are substituted by ammonium groups.

Synthesis Example 3

Production of Hyperbranched Polymer 2
(HPS-NBu$_3$Cl)

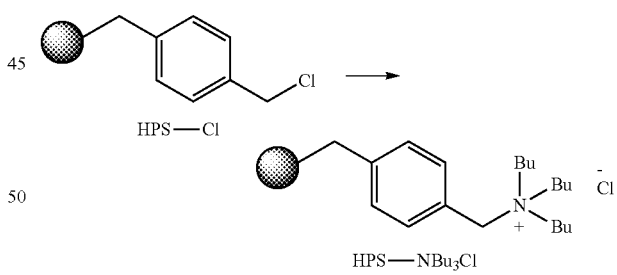

In a 50-mL reaction flask with a reflux tower, 3.0 g (20 mmol) of HPS-Cl produced in Synthesis Example 1, 3.7 g (20 mmol) of tributylamine [manufactured by JUNSEI CHEMICAL CO., LTD.], and 60 g of a chloroform/IPA liquid mixture (volumetric ratio 2:1) were charged, followed by replacement by nitrogen. This mixture was heated to reflux with stirring for 48 hours.

After cooling to a liquid temperature of 30° C., the solvent was distilled off. The resultant residue was dissolved into 50 mL of chloroform, and this solution was added to mL of IPE for reprecipitation and purification. The precipitated polymer was filtered under reduced pressure and vacuum-dried at 40° C., resulting in 5.8 g of a hyperbranched polymer 2

(hereinafter abbreviated as HBP2) having a tributylammonium group at a molecular end in the form of pale brown powder.

Figure 3:
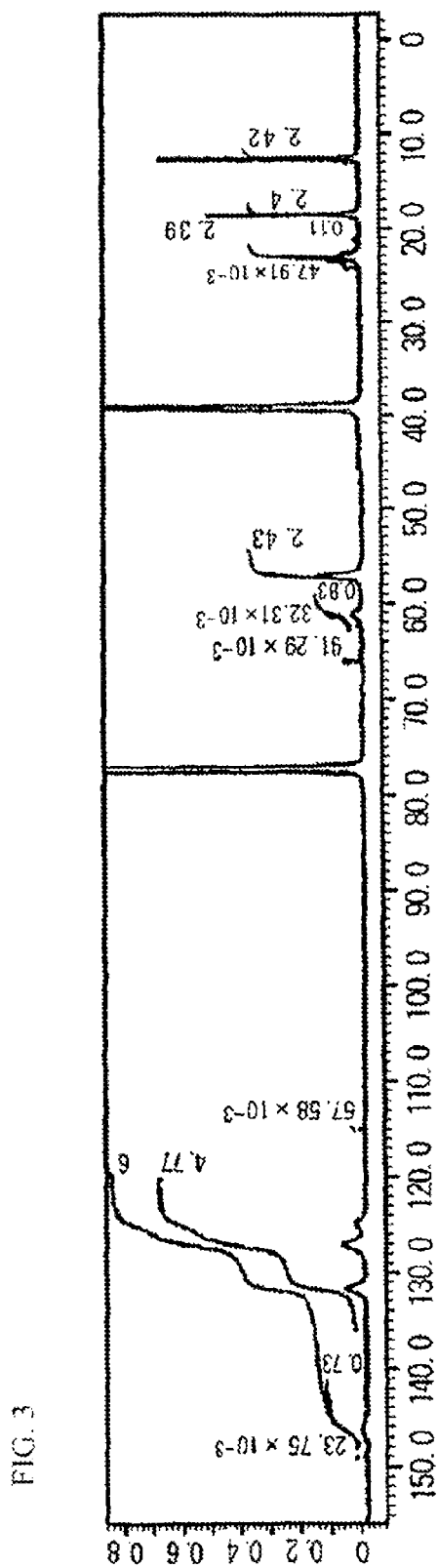
FIG. 3 is a diagram showing a $^{13}$C NMR spectrum of a hyperbranched polymer (HPS-NBu$_3$Cl) that has a tributylammonium group at a molecular end and that is obtained in Synthesis Example 3.

The $^{13}$C NMR spectrum of the resultant HBP2 is shown in FIG. 3. Based on the peaks of the methylene group bonded to a chlorine atom and the methylene group bonded to an ammonium group, it is evident that in the resultant HBP2, 80% of chlorine atoms at the HPS-Cl molecular ends are substituted by ammonium groups.

Synthesis Example 4

Production of Hyperbranched Polymer 3
(HPS-NHex$_3$Cl)

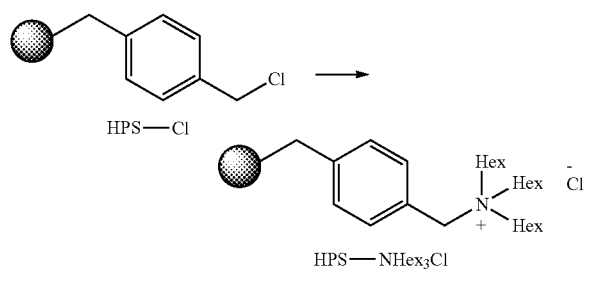

In a 50-mL reaction flask with a reflux tower, 3.0 g (20 mmol) of HPS-Cl produced in Synthesis Example 1, 5.4 g (20 mmol) of trihexylamine [manufactured by Alfa Aesar], and 80 g of a chloroform/IPA liquid mixture (volumetric ratio 4:1) were charged, followed by replacement by nitrogen. This mixture was heated to reflux with stirring for 48 hours.

After cooling to a liquid temperature of 30° C., the solvent was distilled off. The resultant residue was dissolved into 80 g of chloroform, and this solution was added to 400 g of IPE for reprecipitation and purification. The precipitated polymer was filtered under reduced pressure and vacuum-dried at 40° C., resulting in 7.2 g of a hyperbranched polymer 3 (hereinafter abbreviated as HBP3) having a trihexylammonium group at a molecular end in the form of white powder.

Figure 4:
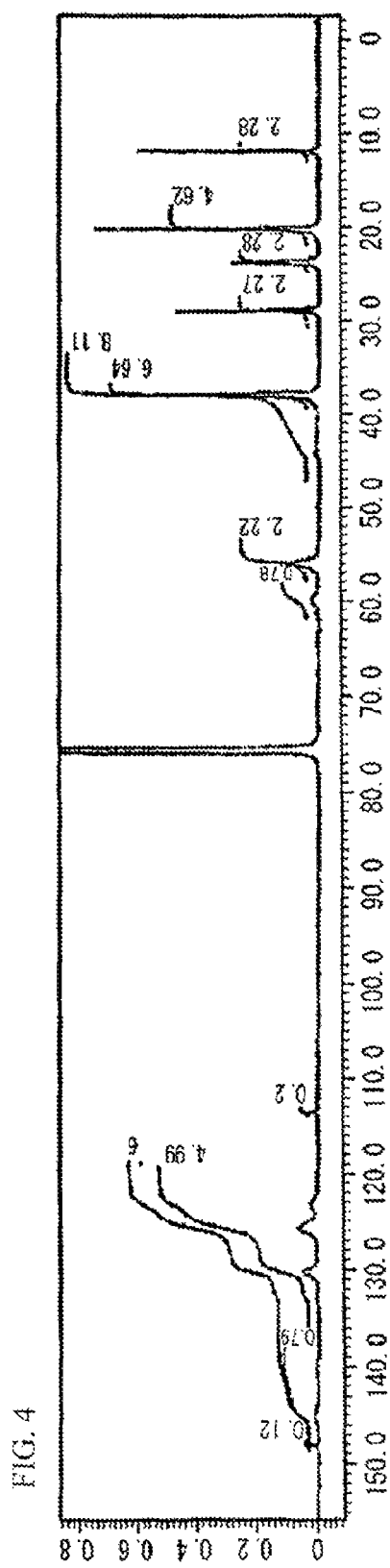
FIG. 4 is a diagram showing a $^{13}$C NMR spectrum of a hyperbranched polymer (HPS-NHex$_3$Cl) that has a trihexylammonium group at a molecular end and that is obtained in Synthesis Example 4.

The $^{13}$C NMR spectrum of the resultant HBP3 is shown in FIG. 4. Based on the peaks of the methylene group bonded to a chlorine atom and the methylene group bonded to an ammonium group, it is evident that in the resultant HBP3, 76% of chlorine atoms at the HPS-Cl molecular ends are substituted by ammonium groups.

Synthesis Example 5

Production of Hyperbranched Polymer 4
(HPS-NOct$_3$Cl)

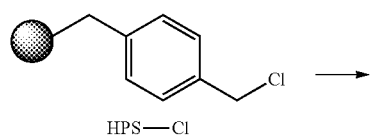

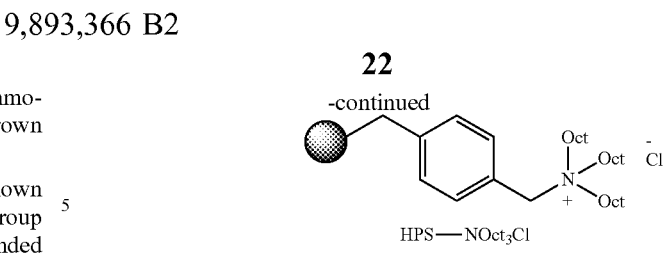

In a 100-mL reaction flask with a reflux tower, 4.6 g (30 mmol) of HPS-CL produced in Synthesis Example 1, 10.6 g (30 mmol) of trioctylamine [manufactured by JUNSEI CHEMICAL CO., LTD.], and 150 g of a chloroform/IPA liquid mixture (volumetric ratio 4:1) were charged, followed by replacement by nitrogen. This mixture was heated to reflux with stirring for 48 hours.

After cooling to a liquid temperature of 30° C., the solvent was distilled off. The resultant residue was dissolved into 150 g of chloroform and cooled to 0° C. This solution was added to 3,000 g of IPE at 0° C. for reprecipitation and purification. The precipitated polymer was filtered under reduced pressure and vacuum-dried at 40° C., resulting in 9.6 g of a hyperbranched polymer 4 (hereinafter abbreviated as HBP4) having a trioctylammonium group at a molecular end in the form of pale yellow powder.

Figure 5:
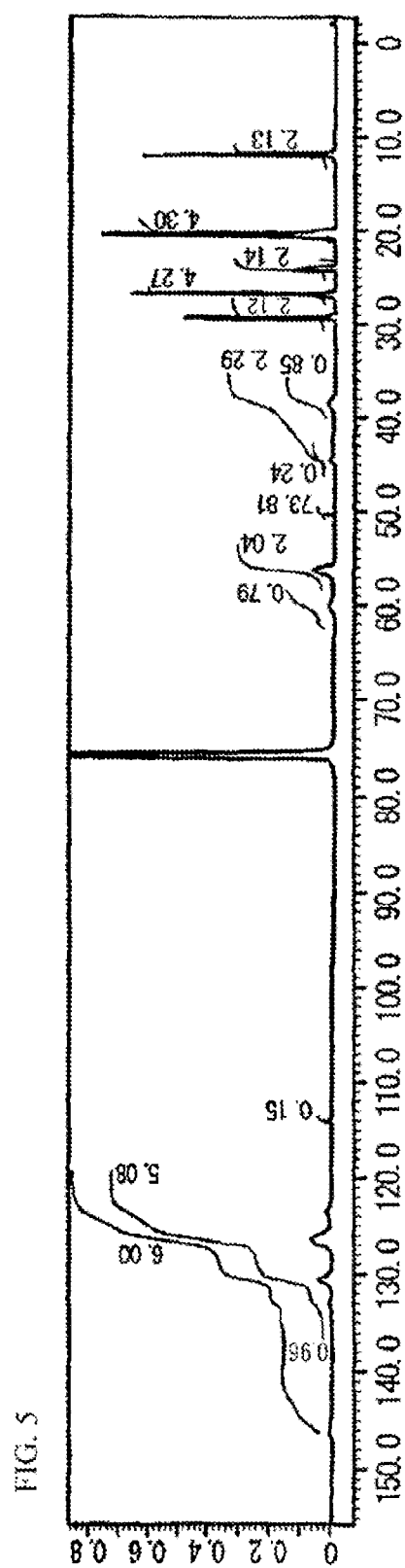
FIG. 5 is a diagram showing a $^{13}$C NMR spectrum of a hyperbranched polymer (HPS-NOct$_3$Cl) that has a trioctylammonium group at a molecular end and that is obtained in Synthesis Example 5.

The $^{13}$C NMR spectrum of the resultant HBP4 is shown in FIG. 5. Based on the peaks of the methylene group bonded to a chlorine atom and the methylene group bonded to an ammonium group, it is evident that in the resultant HBP4, 71% of chlorine atoms at the HPS-Cl molecular ends are substituted by ammonium groups.

Synthesis Example 6

Production of Hyperbranched Polymer 5
(HPS-N(Me)$_2$BuCl)

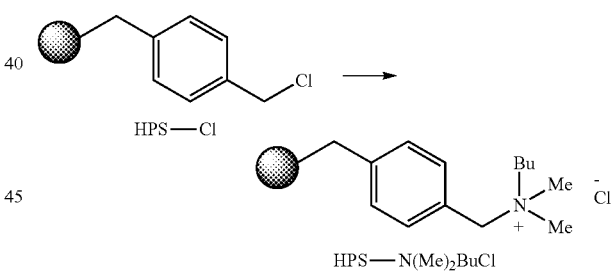

In a 100-mL reaction flask with a reflux tower, 3.0 g (20 mmol) of HPS-Cl produced in Synthesis Example 1, 2.0 g (20 mmol) of butyldimethylamine [manufactured by Aldrich], and 50 g of a chloroform/IPA liquid mixture (volumetric ratio 2:1) were charged, followed by replacement by nitrogen. This mixture was heated to reflux with stirring for 48 hours.

After cooling to a liquid temperature of 30° C., the solvent was distilled off. The resultant residue was dissolved into 50 g of chloroform, and this solution was added to 1,000 g of IPE for reprecipitation and purification. The precipitated polymer was filtered under reduced pressure and vacuum-dried at 40° C., resulting in 3.9 g of a hyperbranched polymer 5 (hereinafter abbreviated as HBP5) having a butyldimethylammonium group at a molecular end in the form of white powder.

Figure 6:
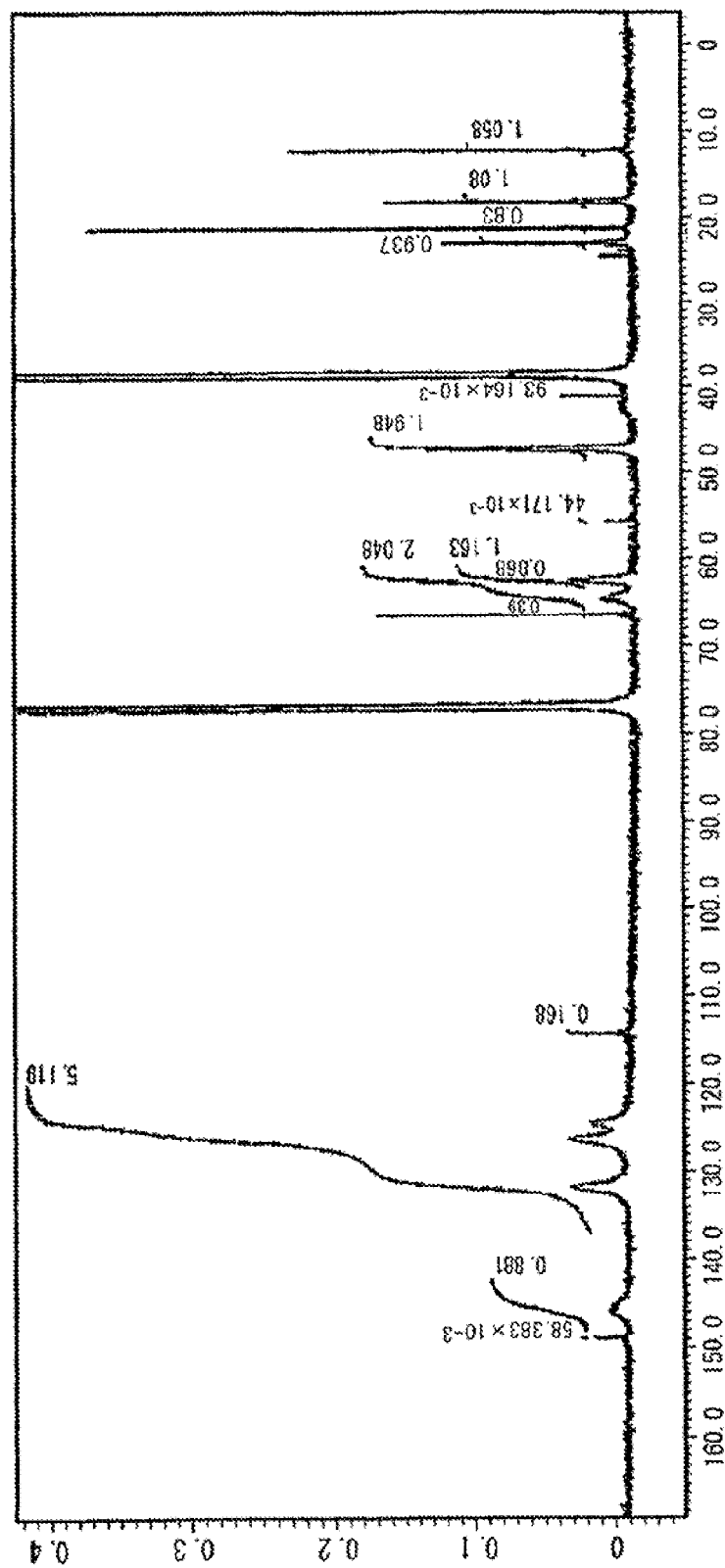
FIG. 6 is a diagram showing a $^{13}$C NMR spectrum of a hyperbranched polymer (HPS-N(Me)$_2$BuCl) that has a butyldimethylammonium group at a molecular end and that is obtained in Synthesis Example 6.

The $^{13}$C NMR spectrum of the resultant HBP5 is shown in FIG. 6. Based on the peaks of the methylene group bonded to a chlorine atom and the methylene group bonded to an ammonium group, it is evident that in the resultant HBP5, the chlorine atoms at the HPS-Cl molecular ends are quantitatively substituted by ammonium groups.

Synthesis Example 7

Production of Hyperbranched Polymer 6
(HPS-N(Me)$_2$OctCl)

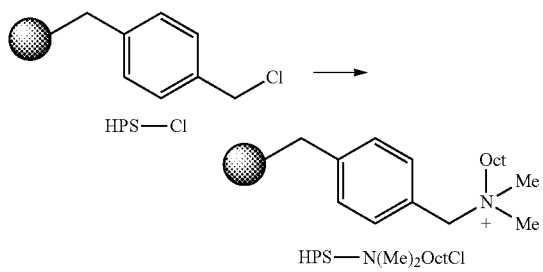

In a 100-mL reaction flask with a reflux tower, 3.0 g (20 mmol) of HPS-Cl produced in Synthesis Example 1, 3.1 g (20 mmol) of dimethyloctylamine [manufactured by KANTO CHEMICAL CO., INC.], and 60 g of a chloroform/IPA liquid mixture (volumetric ratio 4:1) were charged, followed by replacement by nitrogen. This mixture was heated to reflux with stirring for 48 hours.

After cooling to a liquid temperature of 30° C., the solvent was distilled off. The resultant residue was dissolved into 60 g of chloroform, and this solution was added to 1,200 g of IPE for reprecipitation and purification. The precipitated polymer was filtered under reduced pressure and vacuum-dried at 40° C., resulting in 5.6 g of a hyperbranched polymer 6 (hereinafter abbreviated as HBP6) having a dimethyloctylammonium group at a molecular end in the form of white powder.

Figure 7:
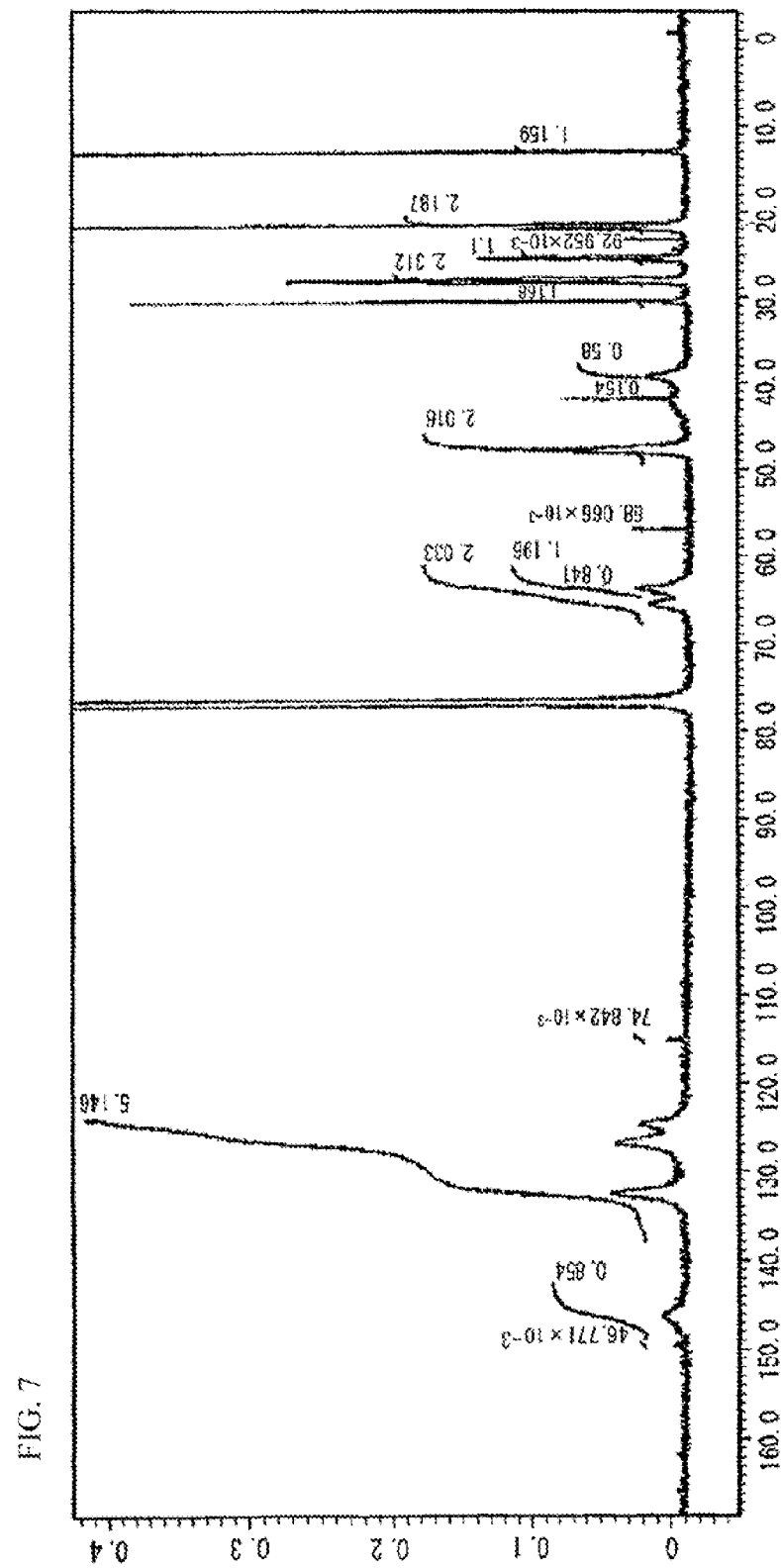
FIG. 7 is a diagram showing a $^{13}$C NMR spectrum of a hyperbranched polymer (HPS-N(Me)$_2$OctCl) that has a dimethyl(octyl)ammonium group at a molecular end and that is obtained in Synthesis Example 7.

The $^{13}$C NMR spectrum of the resultant HBP6 is shown in FIG. 7. Based on the peaks of the methylene group bonded to a chlorine atom and the methylene group bonded to an ammonium group, it is evident that in the resultant HBP6, the chlorine atoms at the HPS-Cl molecular ends are quantitatively substituted by ammonium groups.

[Example 1] Production of Palladium Fine Particle Association 1

In a 50-mL two necked flask, 200 mg of HBP1 produced in Synthesis Example 2, 100 mg of Pd$_2$(dba)$_3$.CHCl$_3$ [manufactured by N.E. CHEMCAT Corporation], and 10 mL of a chloroform/ethanol liquid mixture (volumetric ratio 2:1) were charged, followed by replacement by nitrogen. This mixture was stirred at 70° C. for six hours with stirring.

After cooling to a liquid temperature of 30° C., the solvent was distilled off. The resultant residue was dissolved into 10 mL of chloroform, and this solution was added to 50 mL of IPE for reprecipitation and purification. The precipitated polymer was filtered under reduced pressure and vacuum-dried at 60° C., resulting in 143 mg of a composite of HBP1 and palladium fine particles (HBP1-Pd) in the form of black powder.

The result of the ICP optical emission spectrometry showed that the palladium content in the resultant HBP1-Pd was 19% by mass.

Next, HBP1-Pd and ethanol were mixed to attain a HBP1-Pd concentration of 10 mg/mL and subjected to ultrasonic treatment for 30 minutes, resulting in a HBP1-Pd/ethanol solution.

CB and ethanol were mixed separately to attain a CB concentration of 10 mg/mL and subjected to ultrasonic treatment for 30 minutes, resulting in a CB/ethanol dispersion liquid.

The HBP1-Pd/ethanol solution and the CB/ethanol dispersion liquid were mixed in the same volume and subjected to ultrasonic treatment for 30 minutes. This liquid mixture was put into a crucible with the temperature increased up to 500° C. at 5° C./min under a nitrogen atmosphere and heated at 500° C. kept for one hour. The liquid mixture was left cool to room temperature (about 25° C.), resulting in a CB-supported palladium fine particle association 1.

The palladium content in the resultant mixture (CB+palladium fine particle association 1) was 14% by mass. The TEM observation of the mixture demonstrated that the palladium particle diameters (primary particle diameters) in the mixture were 2 nm to 4 nm and a plurality of primary particles were associated to form an association of 10 nm to 50 nm.

[Example 2] Production of Palladium Fine Particle Association 2

Figure 8:
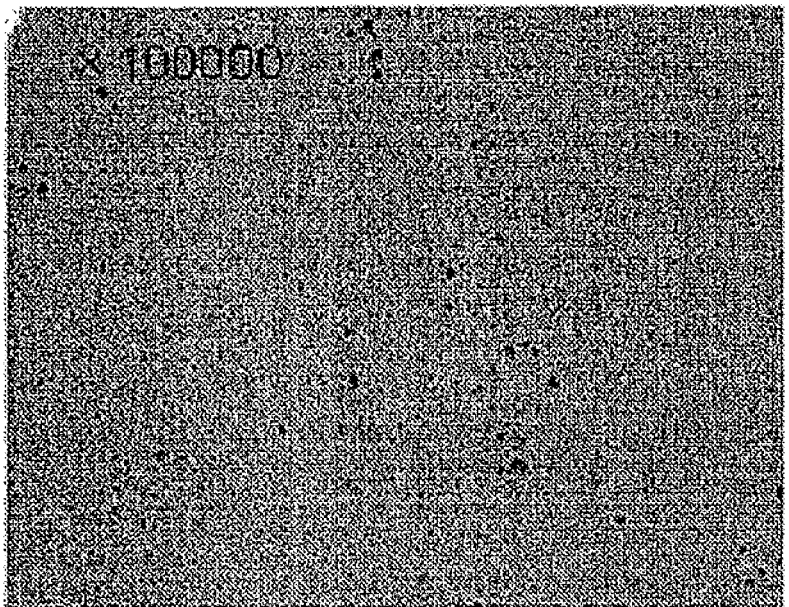
FIG. 8 shows a TEM image of a composite (HBP2-Pd (Pd[HPS-NBu$_3$Cl])) of HBP2 and palladium fine particles that is produced in Example 2.

The same operation as in Example 1 was carried out except that HBP1 was changed to HBP2 produced in Synthesis Example 3, resulting in a composite (HBP2-Pd) of HBP2 and palladium fine particles. The result of the ICP optical emission spectrometry showed that the palladium content in the resultant HBP2-Pd was 9% by mass. The palladium particle diameters in the composite observed by a TEM were 2 nm to 4 nm. The TEM image of the composite is shown in FIG. 8.

The same operation as in Example 1 was carried out except that HBP1-Pd was changed to HBP2-Pd, resulting in a CB-supported palladium fine particle association 2.

Figure 9:
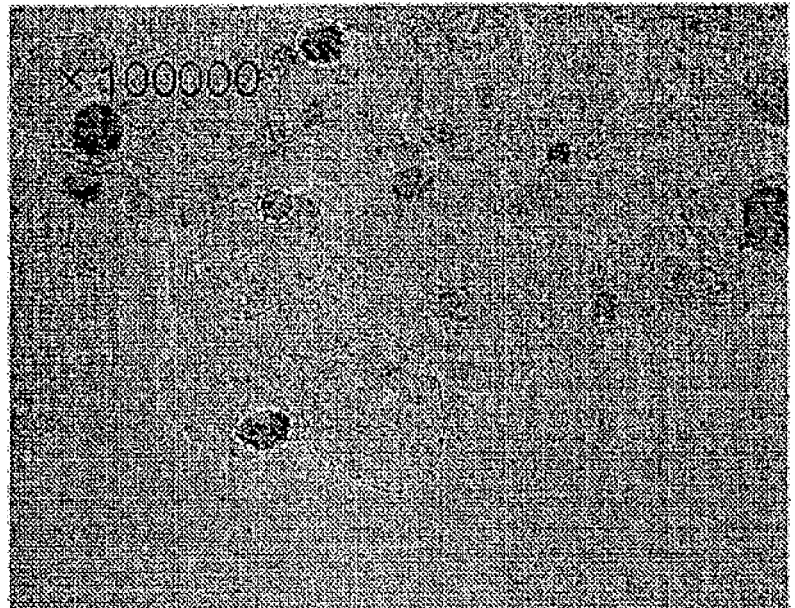
FIG. 9 shows a TEM image of a mixture (Pd[HPS-NBu$_3$Cl]/CB) of CB and the palladium fine particle association 1 that is produced in Example 2.

The palladium content in the resultant mixture (CB+palladium fine particle association 2) was 16% by mass. The TEM observation of the mixture demonstrated that the palladium particle diameters (primary particle diameters) in the mixture were 2 nm to 4 nm and a plurality of primary particles were associated to form an association of 10 nm to 25 nm. The TEM image of the mixture is shown in FIG. 9. In FIG. 9, the approximately circular region surrounded by the white dotted line indicates an association, and the black dot in the region (association) indicates a metal fine particle (palladium fine particle). The larger, approximately circular region surrounded by the black dotted line indicates the conductive support (CB).

[Example 3] Production of Palladium Fine Particle Association 3

The same operation as in Example 1 was carried out except that HBP1 was changed to HBP3 produced in Synthesis Example 4, resulting in a composite (HBP3-Pd) of HBP3 and palladium fine particles. The result of the ICP optical emission spectrometry showed that the palladium content in the resultant HBP3-Pd was 22% by mass.

The same operation as in Example 1 was carried out except that HBP1-Pd was changed to HBP3-Pd and HBP3-Pd was dissolved in acetone, resulting in a CB-supported palladium fine particle association 3.

The palladium content in the resultant mixture (CB+palladium fine particle association 3) was 17% by mass. The TEM observation of the mixture demonstrated that the palladium particle diameters (primary particle diameters) in the mixture were 2 nm to 4 nm and a plurality of primary particles were associated to form an association of 10 nm to 70 nm.

[Example 4] Production of Palladium Fine Particle Association 4

The same operation as in Example 1 was carried out except that HBP1 was changed to HBP4 produced in Synthesis Example 5, resulting in a composite (HBP4-Pd) of HBP4 and palladium fine particles. The result of the ICP optical emission spectrometry showed that the palladium content in the resultant HBP4-Pd was 11% by mass.

The same operation as in Example 1 was carried out except that HBP1-Pd was changed to HBP4-Pd and HBP4-Pd was dissolved in acetone, resulting in a CB-supported palladium fine particle association 4.

The palladium content in the resultant mixture (CB+palladium fine particle association 4) was 8% by mass. The TEM observation of the mixture demonstrated that the palladium particle diameters (primary particle diameters) in the mixture were 2 nm to 4 nm and a plurality of primary particles were associated to form an association of 10 nm to 50 nm.

[Example 5] Production of Palladium Fine Particle Association 5

The same operation as in Example 1 was carried out except that HBP1 was changed to HBP5 produced in Synthesis Example 6, resulting in a composite (HBP5-Pd) of HBP5 and palladium fine particles. The result of the ICP optical emission spectrometry showed that the palladium content in the resultant HBP5-Pd was 11% by mass.

The same operation as in Example 1 was carried out except that HBP1-Pd was changed to HBP5-Pd, resulting in a CB-supported palladium fine particle association 5.

The palladium content in the resultant mixture (CB+palladium fine particle association 5) was 16% by mass. The TEM observation of the mixture demonstrated that the palladium particle diameters (primary particle diameters) in the mixture were 2 nm to 4 nm and a plurality of primary particles were associated to form an association of 10 nm to 50 nm.

[Example 6] Production of Palladium Fine Particle Association 6

The same operation as in Example 1 was carried out except that HBP1-Pd was changed to HBP5-Pd produced in Example 5 and the heating temperature was changed to 300° C., resulting in a CB-supported palladium fine particle association 6.

The palladium content in the resultant mixture (CB+palladium fine particle association 6) was 14% by mass. The TEM observation of the mixture demonstrated that the palladium particle diameters (primary particle diameters) in the mixture were 2 nm to 4 nm and a plurality of primary particles were associated to form an association of 10 nm to 50 m.

[Example 7] Production of Palladium Fine Particle Association 7

The same operation as in Example 1 was carried out except that HBP1 was changed to HBP6 produced in Synthesis Example 7, resulting in a composite (HBP6-Pd) of HBP6 and palladium fine particles. The result of the ICP optical emission spectrometry showed that the palladium content in the resultant HBP6-Pd was 21% by mass.

The same operation as in Example 1 was carried out except that HBP1-Pd was changed to HBP6-Pd and HBP6-Pd was dissolved in acetone, resulting in a CB-supported palladium fine particle association 7.

The palladium content in the resultant mixture (CB+palladium fine particle association 7) was 13% by mass. The TEM observation of the mixture demonstrated that the palladium particle diameters (primary particle diameters) in the mixture were 2 nm to 4 nm and a plurality of primary particles were associated to form an association of 10 nm to 60 nm.

[Example 8] Formic Acid Oxidation Activity of Palladium Fine Particle Association The CB-supported palladium fine particle associations 1 to 7 produced in Examples 1 to 7 were each added to IPA to attain 10 mg/mL. Each liquid mixture was subjected to ultrasonic treatment for 10 minutes to obtain a catalyst ink. Next, 7.5 µL of this catalyst ink was dropped over the entire upper surface of a glassy carbon electrode and dried at room temperature (about 25° C.) for 20 minutes. Subsequently, 2.5 µL of 5% by mass Nafion (registered trademark) dispersion solution [manufactured by Wako Pure Chemical Industries, Ltd.] was dropped on the catalyst ink coating and dried at room temperature (about 25° C.) for 20 minutes. Additional drying at 80° C. for two hours produced a working electrode with each palladium fine particle association as a catalyst.

A triple electrode cell including the working electrode, a $Hg/HgSO_4$ reference electrode, and a Pt wire counter electrode was fabricated to measure cyclic voltammetry (CV). The formic acid oxidation activity was evaluated by calculating the maximum current value per unit palladium mass at 0.5 V (against the hydrogen reference electrode) of each working electrode. The results are shown collectively in Table 1.

[Comparative Example 1] Formic Acid Oxidation Activity of Palladium Catalyst with HBP5 as Dispersant The composite HBP5-Pd produced in Example 5 and ethanol were mixed to attain a HBP5-Pd concentration of 10 mg/mL and subjected to ultrasonic treatment for 30 minutes, resulting in a HBP5-Pd/ethanol solution.

CB and ethanol were mixed separately to attain a CB concentration of 10 mg/mL and subjected to ultrasonic treatment for 30 minutes, resulting in a CB/ethanol dispersion liquid.

The HBP5-Pd/ethanol solution and the CB/ethanol dispersion liquid were mixed in the same volume and subjected to ultrasonic treatment for 30 minutes to obtain a catalyst ink.

The TEM observation of the resultant catalyst ink demonstrated that the palladium particle diameters (primary particle diameters) in the ink were 2 nm to 4 nm and the primary particles were uniformly dispersed on CB without association or aggregation.

A working electrode was fabricated using this catalyst ink in the same manner as in Example 8, and the formic acid oxidation activity was evaluated. The results are shown collectively in Table 1.

[Comparative Example 2] Formic Acid Oxidation Activity of PB/CB Mixture

PB and IPA were mixed to attain a PB concentration of 10 mg/mL and subjected to ultrasonic treatment for 30 minutes, resulting in a PB/IPA dispersion liquid.

CB and ethanol were mixed separately to attain a CB concentration of 10 mg/mL and subjected to ultrasonic treatment for 30 minutes, resulting in a CB/ethanol dispersion liquid.

The PB/IPA dispersion liquid and the CB/ethanol dispersion liquid were mixed in the same volume and subjected to ultrasonic treatment for 30 minutes to obtain a catalyst ink.

The TEM observation of the resultant catalyst ink demonstrated that the palladium particles in the ink were sintered and the primary particle diameter exceeded 20 nm.

A working electrode was fabricated using this catalyst ink in the same manner as in Example 8, and the formic acid oxidation activity was evaluated. The results are shown collectively in Table 1.

[Comparative Example 3] Formic Acid Oxidation Activity of PB

The same operation as in Comparative Example 2 was performed to obtain a catalyst ink, except that the CB/ethanol dispersion liquid was not mixed.

The TEM observation of the resultant catalyst ink demonstrated that the palladium particles in the ink were sintered and the primary particle diameter exceeded 20 nm.

A working electrode was fabricated using this catalyst ink in the same manner as in Example 8, and the formic acid oxidation activity was evaluated. The results are shown collectively in Table 1.

[Comparative Example 4] Formic Acid Oxidation Activity of Palladium Catalyst with PVP as Dispersant The same operation as in Example 1 was carried out except that palladium fine particles with PVP as a dispersant [nanopalladium dispersion liquid manufactured by Renaissance Energy Research, mean particle diameter 2 nm to 7 nm] were used in place of HBP1-Pd, resulting in CB-supported palladium fine particles. The palladium content in the resultant mixture (CB+palladium fine particles) was 10% by mass.

The same operation as in Examples 8 was carried out except that the CB-supported palladium fine particle associations 1 to 7 were changed to the mixture above, and the formic acid oxidation activity was evaluated. The results are shown collectively in Table 1.

As shown in Table 1, the palladium fine particle associations (Examples 1 to 7) of the invention in the present specification exhibit extremely high formic acid oxidation activity, four to ten times higher than the conventionally used PB (Comparative Examples 2, 3). The palladium fine particles (Comparative Example 1) with the same hyperbranched polymer as in the invention in the present specification as a dispersant and without a heating process do not form associations and exhibit extremely low formic acid oxidation activity. The palladium fine particle associations (Examples 1 to 7) of the invention in the present specification exhibit extremely high formic acid oxidation activity, three to seven times higher than the palladium fine particles (Comparative Example 4) with a linear polymer PVP as a dispersant and with a heating process.

[Example 9] Power Generation Characteristics of Direct Formic Acid Fuel Cell with Palladium Fine Particle Association 7

The CB-supported palladium fine particle association 7 produced in Example 7 was added to IPA to attain 10 mg/mL and subjected to ultrasonic treatment for 10 minutes. A 5% by mass Nafion (registered trademark) dispersion solution [manufactured by Wako Pure Chemical Industries, Ltd.] was added thereto so that the amount of Nafion (registered trademark) added was 20% by mass of the palladium mass in the liquid mixture. This liquid mixture was further subjected to ultrasonic treatment for 10 minutes to obtain a catalyst ink.

Next, 2.5 mL of this catalyst ink was dropped over the entire upper surface of carbon paper (22×22 mm, CB coating amount: 1 mg/cm$^2$) having a CB coating in advance as an underlayer and dried at room temperature (about 25° C.) for 20 minutes. Additional drying at 80° C. for two hours produced an anode electrode for fuel cells.

Figure 10:
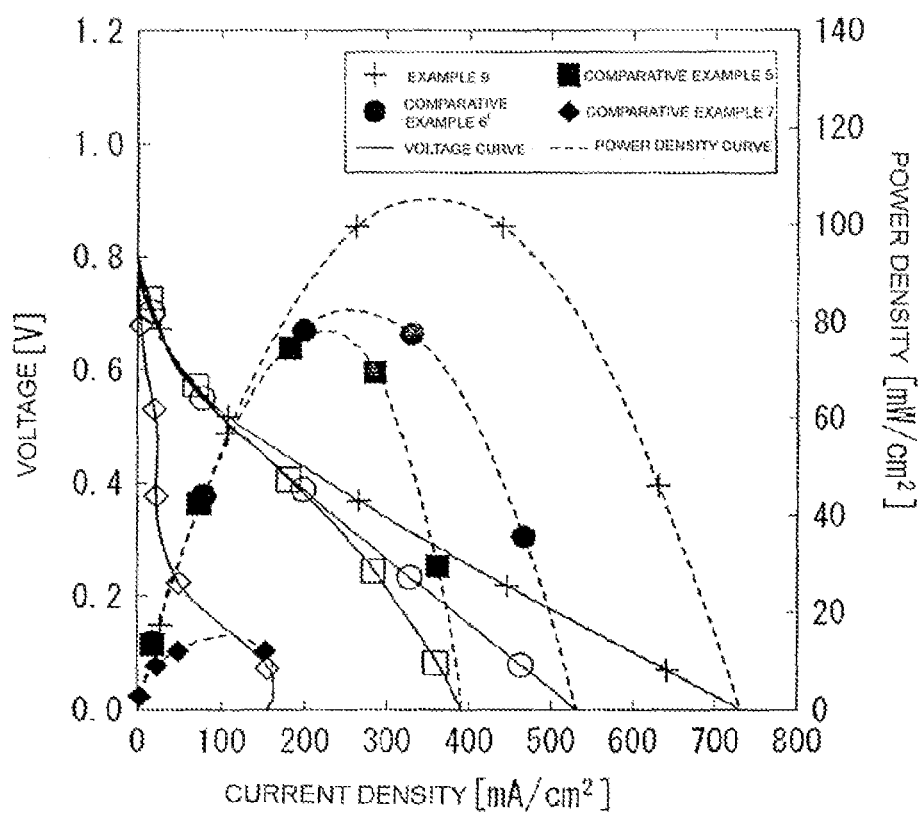
FIG. 10 is a graph showing power generation characteristics (current-voltage curves and current density curves) of fuel cells produced in Example 9 and Comparative Examples 5 to 7.

A Nafion (registered trademark) membrane [Nafion (registered trademark) 117 manufactured by Du Pont Kabushiki Kaisha] was sandwiched between the anode electrode and a 1 mg/cm$^2$ Pt/C electrode [EC-20-10-7 manufactured by TOYO Corporation] and hot-pressed at 137° C. for three minutes to produce a membrane electrode assembly (MEA). This was built into a power generation cell, and current to voltage (i-v) measurement was performed. The obtained i-v curve and power density curve are shown in FIG. 10. The

TABLE 1

| | Dispersant | Conductive support | Heating temperature [° C.] | Primary particle diameter [nm] | Association diameter [nm] | Maximum current value [mA/mg-Pd] |
|---|---|---|---|---|---|---|
| Example 1 | HBP1 | CB | 500 | 2-4 | 10-50 | 2,400 |
| Example 2 | HBP2 | CB | 500 | 2-4 | 10-25 | 3,400 |
| Example 3 | HBP3 | CB | 500 | 2-4 | 10-70 | 1,800 |
| Example 4 | HBP4 | CB | 500 | 2-4 | 10-50 | 4,200 |
| Example 5 | HBP5 | CB | 500 | 2-4 | 10-50 | 2,600 |
| Example 6 | HBP5 | CB | 300 | 2-4 | 10-50 | 1,400 |
| Example 7 | HBP6 | CB | 500 | 2-4 | 10-60 | 2,600 |
| Comparative Example 1 | HBP5 | CB | Not heated | 2-4 | Uniformly dispersed | 2 |
| Comparative Example 2 | None | CB | Not heated | >20 | Coagulated | 400 |
| Comparative Example 3 | None | None | Not heated | >20 | Coagulated | 400 |
| Comparative Example 4 | PVP | CB | 500 | No data* | No data* | 600 |

*TEM observation has not been carried out.

power generation characteristics of the fuel cell were evaluated by calculating the cell output by standardizing the maximum power density per unit palladium mass. The results are shown in Table 2.

[Comparative Example 5] Power Generation Characteristics of Direct Formic Acid Fuel Cell with PB/CB Mixture PB and IPA were mixed to attain a PB concentration of 10 mg/mL and subjected to ultrasonic treatment for 30 minutes, resulting in a PB/IPA dispersion liquid.

CB and IPA were mixed separately to attain a CB concentration of 10 ms/mL and subjected to ultrasonic treatment for 30 minutes, resulting in a CB/IPA dispersion liquid.

The PB/IPA dispersion liquid and the CB/IPA dispersion liquid were mixed in the same volume and subjected to ultrasonic treatment for 30 minutes. A 5% by mass Nafion (registered trademark) dispersion solution [manufactured by Wako Pure Chemical Industries, Ltd.] was added thereto so that the amount of Nafion (registered trademark) added was 20% by mass of the palladium mass in the liquid mixture. This liquid mixture was further subjected to ultrasonic treatment for 10 minutes to obtain a catalyst ink.

The same operation as in Example 9 was carried out except that this catalyst ink was used in the PB amount of 107 mg, and the power generation characteristics of the fuel cell were evaluated. The results are shown collectively in FIG. 10 and Table 2.

[Comparative Example 6] Power Generation Characteristics of Direct Formic Acid Fuel Cell with PB The same operation as in Comparative Example 5 was carried out except that the CB/ethanol dispersion liquid was not used, and the power generation characteristics of the fuel cell were evaluated. The results are shown collectively in FIG. 10 and Table 2.

[Comparative Example 7] Power Generation Characteristics of Direct Formic Acid Fuel Cell with PVP Dispersing Palladium Catalyst The same operation as in Example 9 was carried out except that the CB-supported palladium fine particle association 7 was changed to the CB-supported palladium fine particles produced in Comparative Example 4, and the power generation characteristics of the fuel cell were evaluated. The results are shown collectively in FIG. 10 and Table 2.

invention in the present specification provides an extremely high cell output, five times higher than the conventionally used PB (Comparative Examples 5, 6), 2.3 times higher than the palladium fine particle (Comparative Example 7) with a linear polymer PVP as a dispersant and with a heating process.

[Example 10] Production of Platinum Fine Particle Association 1

In a 50-mL two necked flask, 90 mg of HBP1 produced in Synthesis Example 2, 28 mg of $Pt(dba)_2$ [manufactured by N.E. CHEMCAT Corporation], and 10 mL of a chloroform/ethanol liquid mixture (volumetric ratio 2:1) were charged, followed by replacement by nitrogen. This mixture was stirred at 70° C. for six hours with stirring.

After cooling to a liquid temperature of 30° C., the solvent was distilled off. The resultant residue was dissolved into 10 mL of chloroform, and this solution was added to mL of hexane for reprecipitation and purification. The precipitated polymer was filtered under reduced pressure and vacuum-dried at 60° C., resulting in 92 mg of a composite of HBP1 and platinum fine particles (HBP1-Pt) in the form of black powder.

The result of the ICP optical emission spectrometry showed that the platinum content in the resultant HBP1-Pt was 9% by mass.

Next, HBP1-Pt and ethanol were mixed to attain a HBP1-Pt concentration of 10 mg/mL and subjected to ultrasonic treatment for 30 minutes, resulting in a HBP1-Pt/ethanol solution.

CB and ethanol were mixed separately to attain a CB concentration of 10 mg/mL and subjected to ultrasonic treatment for 30 minutes, resulting in a CB/ethanol dispersion liquid.

The HBP1-Pt/ethanol solution and the CB/ethanol dispersion liquid were mixed in the same volume and subjected to ultrasonic treatment for 30 minutes. This liquid mixture was put into a crucible with the temperature increased up to 300° C. at 5° C./min under a nitrogen atmosphere and heated at 300° C. kept for one hour. The liquid mixture was left cool to room temperature (about 25° C.), resulting in a CB-supported platinum fine particle association 1.

The platinum content in the resultant mixture (CB+ platinum fine particle association 1) was 6% by mass.

[Example 11] Production of Platinum Fine Particle Association 2

The same operation as in Example 10 was carried out except that HBP1 was changed to HBP4 produced in Synthesis Example 5, resulting in 89 mg of a composite (HBP4-Pt) of HBP4 and platinum fine particles in the form of black

TABLE 2

|  | Dispersant | Conductive support | Heating temperature [° C.] | Pd amount [mg/cm$^2$] | Power density [mW/cm$^2$] | Cell output [mW/mg-Pd] |
| --- | --- | --- | --- | --- | --- | --- |
| Example 9 | HBP6 | CB | 500 | 0.58 | 100 | 172 |
| Comparative Example 5 | None | CB | Not heated | 2.20 | 78 | 35 |
| Comparative Example 6 | None | None | Not heated | 2.20 | 82 | 37 |
| Comparative Example 7 | PVF | CB | 500 | 0.20 | 15 | 75 |

As shown in Table 2, it has been demonstrated that the palladium fine particle association 7 (Example 9) of the thesis Example 5, resulting in 89 mg of a composite (HBP4-Pt) of HBP4 and platinum fine particles in the form of black powder. The result of the ICP optical emission spectrometry showed that the platinum content in the resultant HBP4-Pt was 11% by mass.

The same operation as in Example 10 was additionally carried out except that HBP1-Pt was changed to HBP4-Pt and HBP4-Pt was dissolved in acetone, resulting in a CB-supported platinum fine particle association 2.

The platinum content in the resultant mixture (CB+ platinum fine particle association 2) was 8% by mass.

[Example 12] Production of Platinum Fine Particle Association 3

The same operation as in Example 10 was carried out except that HBP1 was changed to HBP6 produced in Synthesis Example 7, resulting in 91 mg of a composite (HBP6-Pt) of HBP6 and platinum fine particles in the form of black powder. The result of the ICP optical emission spectrometry showed that the platinum content in the resultant HBP6-Pt was 11% by mass.

The same operation as in Example 10 was additionally carried out except that HBP1-Pt was changed to HBP6-Pt and HBP6-Pt was dissolved in acetone, resulting in a CB-supported platinum fine particle association 3.

The platinum content in the resultant mixture (CB+ platinum fine particle association 3) was 5% by mass.

[Example 13] Oxygen Reduction Activity of Platinum Fine Particle Association

The CB-supported platinum fine particle associations 1 to 3 produced in Examples 10 to 12 were each added to IPA to attain 10 mg/mL. Each liquid mixture was subjected to ultrasonic treatment for 10 minutes to obtain a catalyst ink. Next, 7.5 µL of this catalyst ink was dropped over the entire upper surface of a glassy carbon electrode and dried at room temperature (about 25° C.) for 20 minutes. Subsequently, 2.5 µL of a 5% by mass Nafion (registered trademark) dispersion solution [manufactured by Wako Pure Chemical Industries, Ltd.] was dropped on the catalyst ink coating and dried at room temperature (about 25° C.) for 20 minutes. Additional drying at 80° C. for two hours produced a working electrode with each platinum fine particle association as a catalyst.

A triple electrode cell including the working electrode, a $Hg/HgSO_4$ reference electrode, and a Pt wire counter electrode was fabricated to measure cyclic voltammetry (CV). CV was obtained by subtracting the cyclic voltammogram under oxygen bubbling from that under nitrogen bubbling. The oxygen reduction reaction activity was evaluated by calculating the maximum current value per unit platinum mass at 0.5 V (against the hydrogen reference electrode) of each working electrode. The results are shown collectively in Table 3.

[Comparative Example 8] Oxygen Reduction Activity of PtB

PtB and IPA were mixed to attain a PtB concentration of 10 mg/mL and subjected to ultrasonic treatment for 30 minutes, resulting in a PtB/IPA dispersion liquid.

A working electrode was fabricated using the PtB/IPA dispersion liquid as a catalyst ink in the same manner as in Example 13, and the oxygen reduction activity was evaluated. The results are shown collectively in Table 3.

[Comparative Example 9] Oxygen Reduction Activity of PtC

PtC and IPA were mixed to attain a PtC concentration of 10 mg/mL and subjected to ultrasonic treatment for 30 minutes, resulting in a PtC/IPA dispersion liquid.

A working electrode was fabricated using the PtC/IPA dispersion liquid as a catalyst ink in the same manner as in Example 13, and the oxygen reduction activity was evaluated. The results are shown collectively in Table 3.

TABLE 3

| | Catalyst | Conductive support | Heating temperature [° C.] | Maximum current value [mA/mg-Pt] |
|---|---|---|---|---|
| Example 10 | HBP1-Pt | CB | 300 | 1,200 |
| Example 11 | HBP4-Pt | CB | 300 | 700 |
| Example 12 | HBP6-Pt | CB | 300 | 600 |
| Comparative Example 8 | PtB | None | Not heated | 30 |
| Comparative Example 9 | PtC | | Not heated | 60 |

As shown in Table 3, it has been demonstrated that the platinum fine particle associations (Examples 10 to 12) of the invention in the present specification provide extremely high oxygen reduction activity, about 10 to 40 times higher than PtB (Comparative Example 8) and PtC (Comparative Example 9) conventionally used.

The invention claimed is:
1. A premix for forming an association, comprising:
   metal fine particles; a conductive support, and
   a metal fine particle dispersant composed of a hyperbranched polymer, wherein
   the metal fine particle dispersant is a metal fine particle dispersant composed of a hyperbranched polymer of Formula [1]:

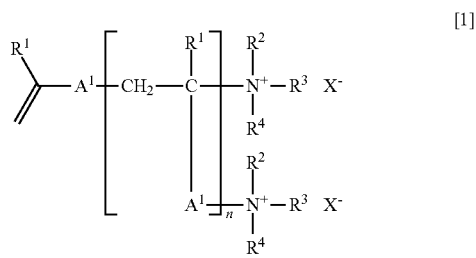

(where $R^1$ is independently a hydrogen atom or a methyl group; $R^2$ to $R^4$ are independently a hydrogen atom, a linear, branched, or cyclic alkyl group having a carbon atom number of 1 to 20, a $C_{7-20}$ arylalkyl group, or $-(CH_2CH_2O)_mR^5$ (where $R^5$ is a hydrogen atom or a methyl group; m is an integer from 2 to 100) (the alkyl group and the arylalkyl group are optionally substituted by an alkoxy group, a hydroxy group, an ammonium group, a carboxy group, or a cyano group), or $R^2$ to $R^4$ are optionally bonded to each other through a linear, branched, or cyclic alkylene group to form a ring together with a nitrogen atom bonded to $R^2$ to $R^4$; $X^-$ is an anion; n is the number of repeating unit structures and is an integer from 2 to 100,000; and $A^1$ is a structure of Formula [2])

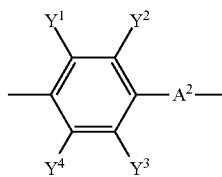

[2]

(where $A^2$ is a linear, branched, or cyclic alkylene group having a carbon atom number of 1 to 30 that optionally includes an ether bond or an ester bond; and $Y^1$ to $Y^4$ are independently a hydrogen atom, a $C_{1-20}$ alkyl group, a $C_{1-20}$ alkoxy group, a nitro group, a hydroxy group, an amino group, a carboxy group, or a cyano group).

2. The premix according to claim 1, further comprising: a solvent.

3. The premix according to claim 1, wherein the metal fine particles are fine particles of at least one selected from the group consisting of iron (Fe), cobalt (Co), nickel (Ni), copper (Cu), ruthenium (Ru), rhodium (Rh), palladium (Pd), silver (Ag), tin (Sn), osmium (Os), iridium (Ir), platinum (Pt), and gold (Au).

4. The premix according to claim 3, wherein the metal fine particles are fine particles of at least one selected from the group consisting of nickel (Ni), palladium (Pd), and platinum (Pt).

5. The premix according to claim 1, wherein the conductive support is a carbon support.

6. A metal fine particle association or an association mixture obtained by subjecting the premix as claimed in claim 1 to a heating process at not lower than 200° C.

7. A method for producing a metal fine particle association or an association mixture, wherein by subjecting the premix as claimed in claim 1 to a heating process at not lower than 200° C.

* * * * *